United States Patent [19]

Alefeld

[11] Patent Number: 4,770,005
[45] Date of Patent: Sep. 13, 1988

[54] PLANT HAVING A HEAT ACCEPTING AND RELEASING PROCESS PORTION AND A HEAT SUPPLY PORTION INCLUDING AN ABSORBER ARRANGEMENT

[76] Inventor: Georg Alefeld, Josef-Raps-Strasse 3, D8000 Munich 40, Fed. Rep. of Germany

[21] Appl. No.: 925,370
[22] PCT Filed: Feb. 5, 1986
[86] PCT No.: PCT/DE86/00038
§ 371 Date: Nov. 17, 1986
§ 102(e) Date: Nov. 17, 1986
[87] PCT Pub. No.: WO86/04517
PCT Pub. Date: Aug. 14, 1986

[30] Foreign Application Priority Data
Feb. 5, 1985 [DE] Fed. Rep. of Germany ....... 3503863

[51] Int. Cl.⁴ .............................................. F25B 1/00
[52] U.S. Cl. ..................... 62/467; 62/238.3; 62/476
[58] Field of Search .................... 62/238.3, 467, 476

[56] References Cited
U.S. PATENT DOCUMENTS

| 3,203,875 | 8/1965 | Sturtevant | 62/238.3 |
| 4,314,668 | 2/1982 | Jansen et al. | 62/238.3 |
| 4,402,795 | 9/1983 | Erickson | 62/476 |
| 4,403,480 | 9/1983 | Frazen | 62/79 |
| 4,441,332 | 4/1984 | Wilkinson | 62/238.3 |
| 4,458,499 | 7/1984 | Grossman | 62/476 |
| 4,523,635 | 6/1985 | Nishizaki et al. | 62/467 |
| 4,530,826 | 7/1985 | Ohashi | 423/376 |
| 4,531,374 | 7/1985 | Alefeld | 62/79 |

FOREIGN PATENT DOCUMENTS

| 278076 | 9/1914 | Fed. Rep. of Germany . |
| 678942 | 7/1939 | Fed. Rep. of Germany . |
| 2489940 | 3/1982 | France . |

Primary Examiner—Ronald C. Capossela
Attorney, Agent, or Firm—Frishauf, Holtz, Goodman & Woodward

[57] ABSTRACT

A plant having a process portion is described, which is supplied with primary operating energy via a heat supply portion. The heat supply portion simultaneously serves to utilize the waste heat released by the process. The heat supply portion includes a combination of a heat transformer and a heat pump, furnishes the input heat energy required by the process portion to the process portion, accepts the output heat energy from the process portion, and in turn releases waste heat at a temperature range that is lower than the output heat temperature range of the process portion. By means of this combination, unusually high energy savings can be achieved.

10 Claims, 30 Drawing Sheets

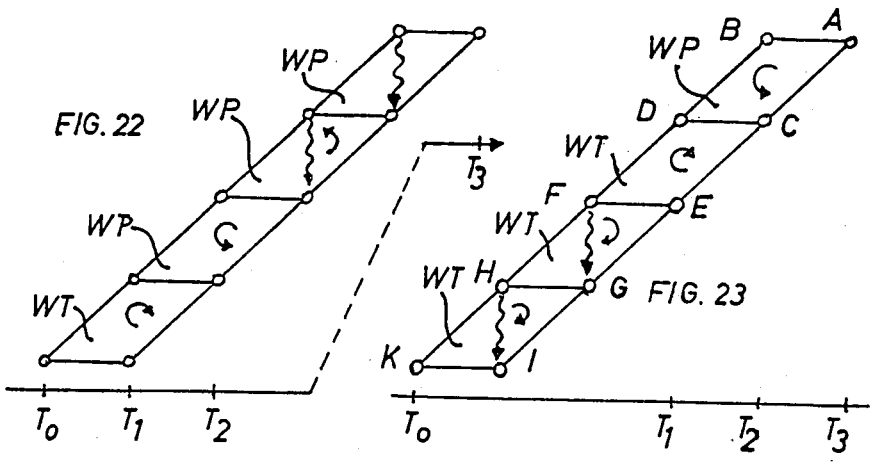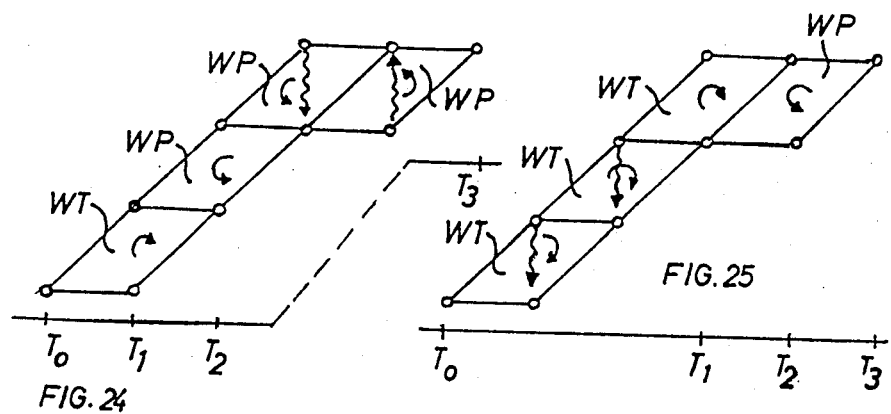

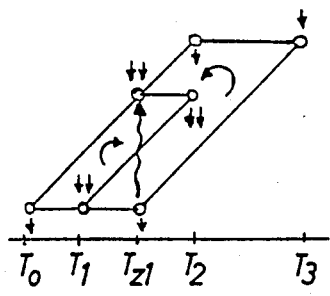
FIG.30
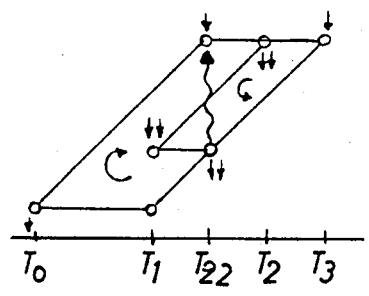
FIG.31
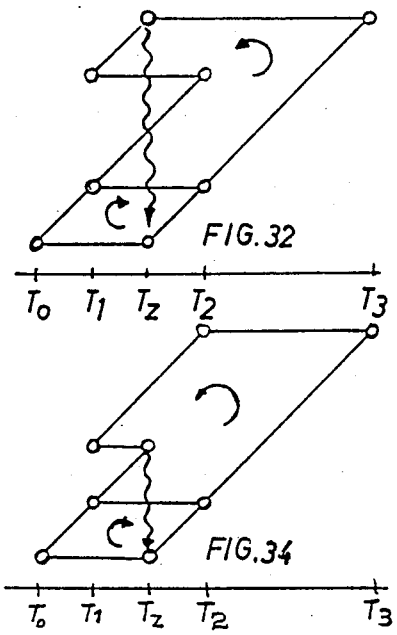
FIG.32
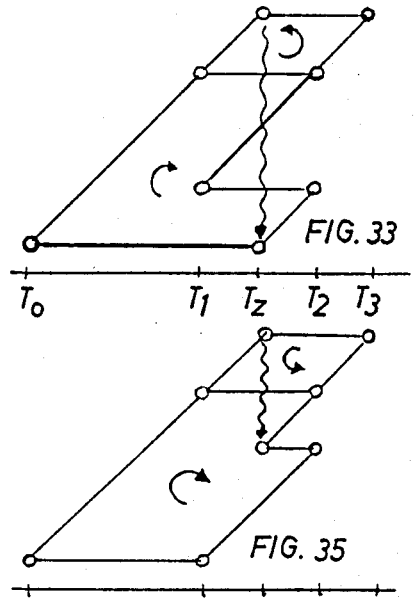
FIG.33
FIG.34
FIG.35
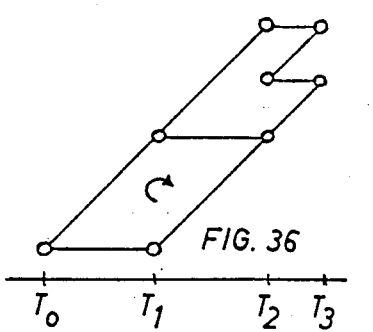
FIG.36
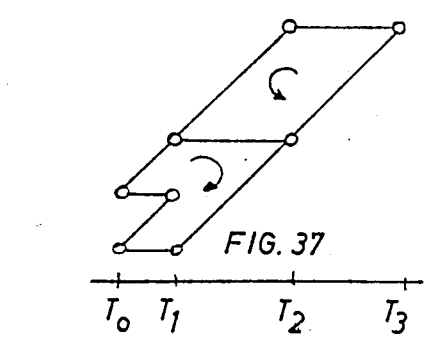
FIG.37

 FIG.39a — all loops counterclockwise —
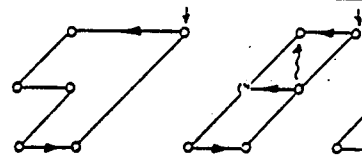
FIG.39b    FIG.39c    FIG.39d
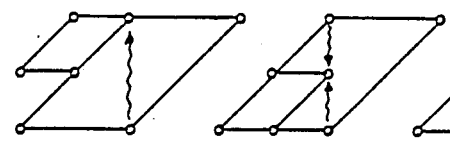
FIG.39e    FIG.39f    FIG.39g
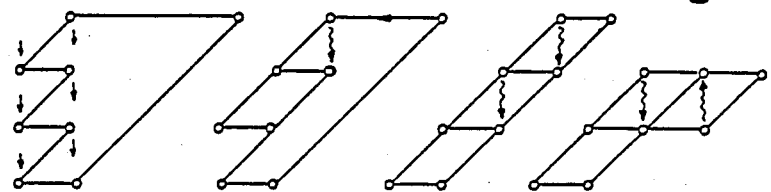
FIG.39h    FIG.39i    FIG.39k    FIG.39l
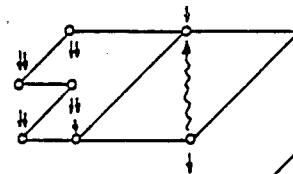 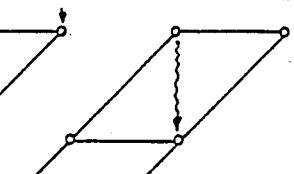 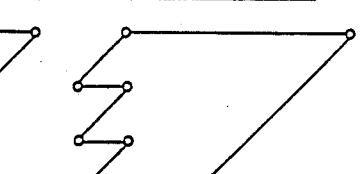
FIG.39m    FIG.39n    FIG.39o
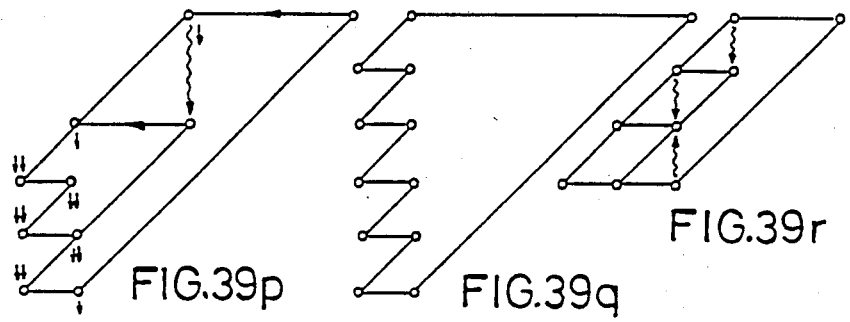
FIG.39p    FIG.39q    FIG.39r

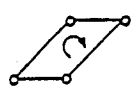 FIG.40a — all loops clockwise —
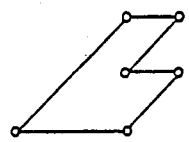
FIG.40b
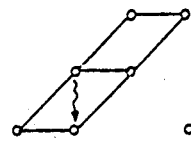
FIG.40c

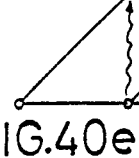
FIG.40e
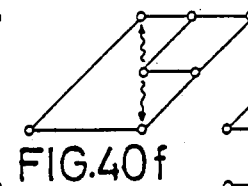
FIG.40f

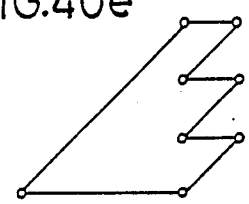
FIG.40h
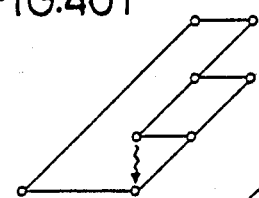
FIG.40i

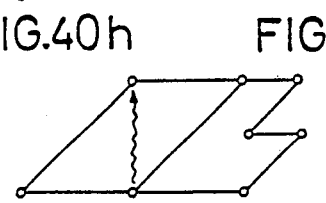
FIG.40m
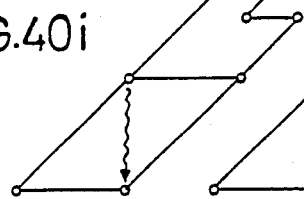
FIG.40n
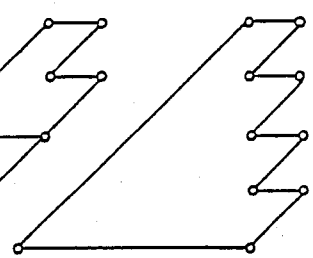
FIG.40o
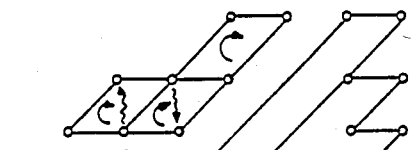
FIG.40l
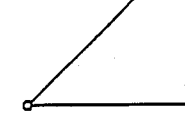
FIG.40p
FIG.40q

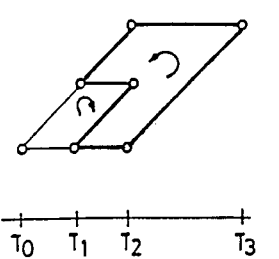 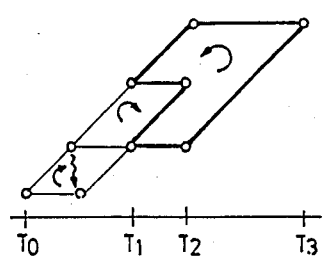 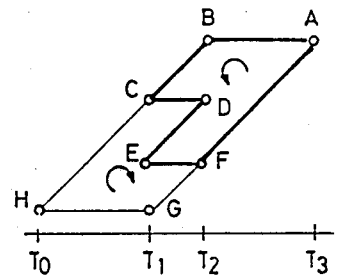
FIG.41　　　　FIG.42　　　　FIG.43
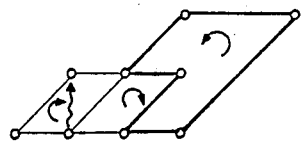 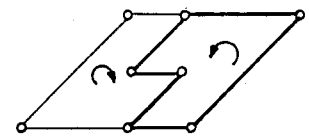
FIG.44　　　　FIG.45
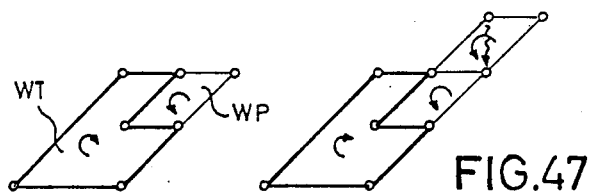
FIG.46　　　　FIG.47
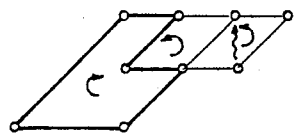
FIG.48

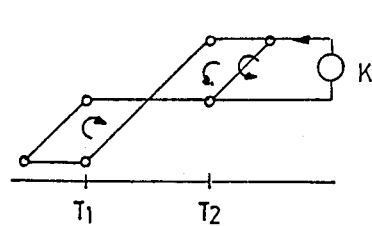
FIG.82
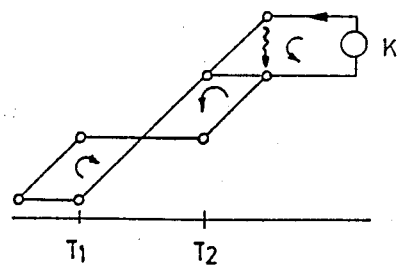
FIG.83

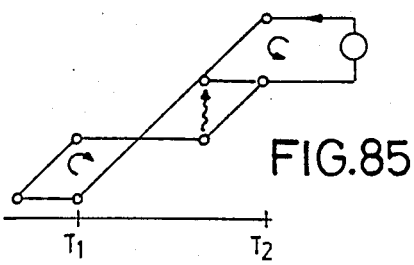
FIG.85
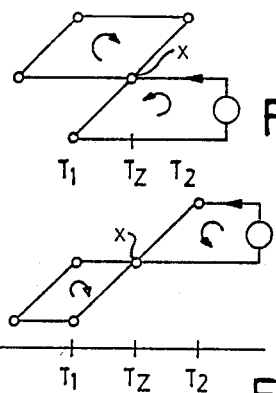
FIG.86
FIG.87
FIG.88
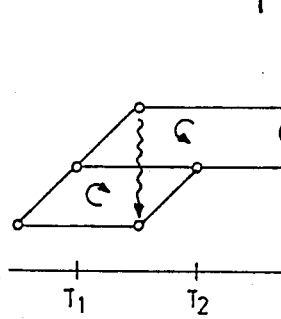
FIG.89
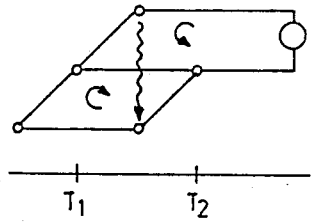
FIG.90

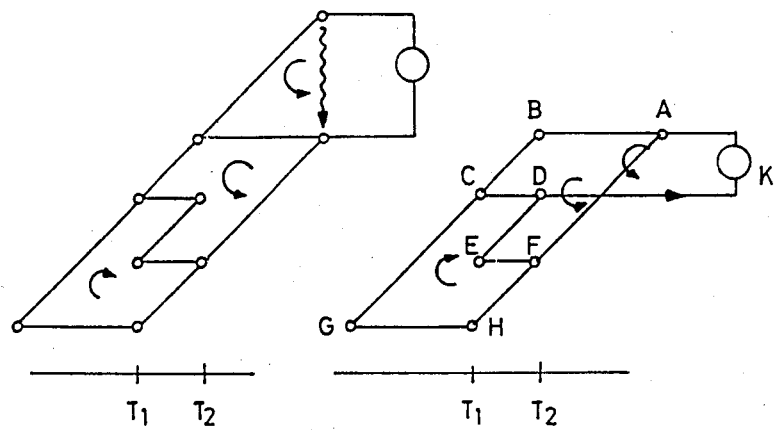
FIG.91     FIG.92
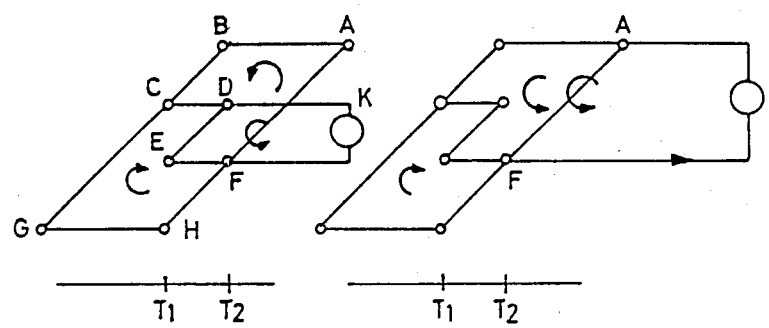
FIG.93     FIG.94
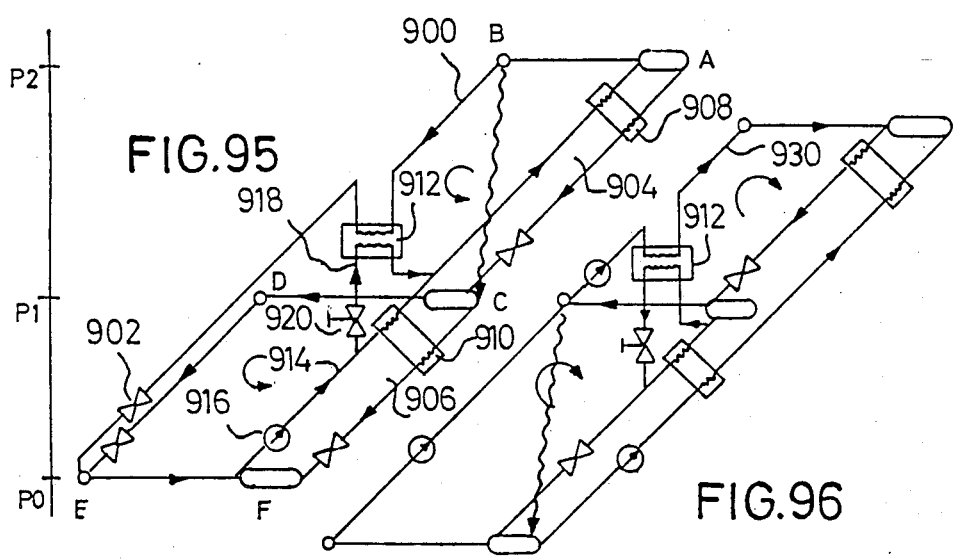
FIG.95
FIG.96

PLANT HAVING A HEAT ACCEPTING AND RELEASING PROCESS PORTION AND A HEAT SUPPLY PORTION INCLUDING AN ABSORBER ARRANGEMENT

The present invention relates to a plant having a process portion, which requires input heat energy at at least one input heat temperature range and from which output heat energy at at least one output heat temperature range, which is lower than the input heat temperature range, must be removed, and having a heat supply portion which includes an absorber arrangement and a supply of operating energy.

Many processes, in particular substance separation processes, require input heat energy at a particular temperature or temperatures and release output heat or waste heat at a lower temperature or temperatures. Often, for instance in distillation processes such as desalination of sea water, the range between the input temperature and the output heat temperature is relatively narrow, frequently only a few Kelvin, so that discarding the waste heat would be extremely uneconomical. A known method for useful recovery of the waste heat in distillation processes is known as exhaust vapor compression; that is, the steam produced in distillation is compressed by means of a mechanical compressor so that it condenses at a higher temperature, and the resultant heat of condensation can be utilized as input heat. Exhaust vapor compression plants which include a heat transformer are also known (German Patent Disclosure Document No. DE-A 30 16 406). The disadvantage of exhaust vapor compression is that mechanical compressors require high-grade driving energy, are expensive to service and are quite noisy in operation.

From U.S. Pat. No. 4,402,795, it is known to supply the waste heat or output heat energy released by a substance separation plant to a heat transformer, which raises the temperature of this output heat energy enough that it can be used as input heat energy for the plant.

From U.S. Pat. No. 4,350,571, it is known to supply a substance separation plant with the heat energy it requires for operation via an absorber heat pump.

The known systems that operate with a heat transformer or a heat pump also have certain disadvantages. If a heat transformer is used, the plant must be supplied with a relatively large proportion of the operating energy it requires for its operation directly, in the form of high-grade primary operating heat energy. If a heat pump is used, on the other hand, then at otherwise comparable conditions the overall result is less-efficient utilization of the primary operating energy than if a heat transformer is used.

It is the object of the present invention to disclose a plant of the above-discussed generic type which requires only relatively little high-grade primary operating energy for its operation and releases only low-grade low-temperature waste heat, so that the thermodynamic efficiency is correspondingly high.

In a plant having a process portion which for operation requires input heat energy in at least one input heat temperature range and from which heat energy in at least one output heat temperature range, which is lower than the input heat temperature range, must be removed, and having a heat supply portion which includes an absorber arrangement and a source of operating energy, in particular a source of operating heat, this object is attained according to the invention in that the heat supply portion includes, as the absorber arrangement, a combination of a heat transformer and a heat pump furnishes the process portion with the input heat energy it requires, accepts the output heat energy from the process portion and in turn is incorporated between the operating energy source and a heat sink, which accepts from the heat supply portion waste heat in a temperature range that is lower than the output heat temperature range of the process portion.

Further developments and advantageous embodiments of the plant according to the invention are the subject of dependent claims.

With the plant according to the invention, a surprisingly high energy saving can be attained, at relatively low expense for equipment, as will be described in greater detail below.

Certain embodiments of the invention are distinguished by a particularly low expense for equipment. Other embodiments are optimized in terms of thermodynamic efficiency. Embodiments for both a relatively wide range and a relatively narrow range between the input heat temperature and the output heat temperature of the process portion are described. In terms of freedom in the construction of the heat supply portion, particular advantages are attained as a result of the fact that the heat supply portion is only thermically coupled with the process portion, that is, whenever the process material is not being used as working fluid in the heat supply portion.

Arrangements functioning on the absorber principle (known as "absorber arrangements"), which contain a heat pump portion in combination with a heat transformer portion, are known in principle, for instance from my European Patent Disclosure Document EP-A No. 61 72 corresponding to U.S. Pat. No. 4,531,374, ALEFELD, and from the German periodical Brennstoff-Warme-Kraft [Fuel - Heat - Power] 33 (1981), No. 12, 486–490. However, these publications do not teach that by combining a heat transformer and a heat pump in the heat supply portion of a process, unusually high energy savings can be attained or how this can be accomplished, in a given process, at the least possible expense for equipment. The heat loop that results in the present combination is traversed multiple times by the heat energy and is responsible for the high efficiency attained.

Preferred exemplary embodiments of the invention will be described in greater detail below, referring to the drawings. The nomenclature and the manner of illustration correspond substantially to those of European Patent Disclosure Document EP-A No. 61 721, to which reference is expressly made herein.

Shown are:

FIG. 1a, a schematic illustration of the conditions pertaining to heat supply in a process, with the aid of which the problem the invention is intended to solve, the principle of the solution provided by the invention for this problem and the surprising progress attained by the invention are to be explained;

FIG. 1b, a diagram in which the energy savings in percent (that is, the ratio of the primary operating energy required by the process and to be supplied from outside when there is no heat transformer and/or heat pump to the operating energy required if a heat supply portion including a heat transformer and/or a heat pump is used) for the various instances addressed in conjunction with FIG. 1a are slotted;

FIG. 2, a schematic illustration of a first embodiment of the invention;

FIGS. 3–8, further schematic illustrations of the heat supply portion of various embodiments of the invention;

FIGS. 9, 9a and 9b, respectively, a schematic illustration, a more-detailed illustration and an associated vapor pressure diagram of a further embodiment of the heat supply portion of a plant according to the invention;

FIGS. 10–13, schematics of further heat supply portions;

FIGS. 14, 14a, and 14b, respectively, illustrations corresponding to FIGS. 9, 9a and 9b, respectively, wherein FIG. 14a also shows the process portion thermically coupled in accordance with FIG. 14 with the heat supply portion, the process portion specifically being a water desalination or distillation apparatus;

FIGS. 15–23, schematic illustrations of further embodiments of the heat supply portion of a plant according to the invention;

FIG. 23a, a vapor pressure diagram pertaining to FIG. 23;

FIGS. 24–38, schematics of further heat supply portions;

FIGS. 39a–39i and 39k–39r, various embodiments of heat pump configurations which can be advantageously used in the heat supply portion of embodiments of the invention;

FIGS. 40a–40i and 40k–40r, various heat transformer configurations which can be advantageously used in the heat supply portion of a plant according to the invention;

FIG. 41, a schematic illustration of a further absorber arrangement for the heat supply portion of a plant according to the invention;

FIG. 41a, a modification of FIG. 41;

FIG. 41b, a somewhat more precise illustration of the arrangement of FIG. 41a;

FIG. 41c, a modification of FIG. 41b;

FIGS. 41d–41g, schematic illustrations showing how certain exchange units of the arrangements according to FIGS. 41b and 41c can be constructed;

FIG. 41h, a modification of FIG. 41c;

FIG. 41i, a vapor pressure diagram for the arrangements according to FIGS. 41b and 41c;

FIG. 42, a schematic of a further heat supply portion;

FIG. 43, a schematic of a heat supply portion that includes a two-stage heat pump and a two-stage heat transformer, each with only a single working fluid loop;

FIG. 43a, a more precise illustration of the arrangement according to FIG. 43;

FIG. 43b, a vapor pressure diagram for FIG. 43a;

FIG. 43c, another possibility for realizing the arrangement according to FIG. 43;

FIG. 43d, a modification of a portion of the arrangement according to FIG. 43a;

FIGS. 44–62, schematics of further absorber arrangements, each including a combination of a heat pump and a heat transformer;

FIGS. 63 and 63a, a schematic of a further embodiment and the associated vapor pressure diagram, respectively;

FIGS. 64–71, further schematic illustrations of embodiments of the heat supply portion of a plant according to the invention;

FIGS. 72–94, embodiments of the heat supply portion of a plant according to the invention which additionally includes a compressor; and FIGS. 95 and 96, schematics of a two-stage heat pump and a two-stage heat transformer, respectively, with particularly advantageous heat exchanger arrangements.

First, the problem addressed by the invention, its solution, and the unexpected advantage thereby attained will be explained, referring to FIGS. 1a and 1b.

FIG. 1a schematically shows a plant having a process portion PRT and a heat supply portion WVT that serves to supply heat economically to the process portion. The process portion requires heat energy Q to operate, part of which is consumed in the process, part of which is unavoidably lost, for instance as a result of incomplete thermal insulation, and part of which appears as waste heat ("output heat") of the process, in particular in the form of latent or specific heat in the process product. Considered in isolation, then, the process portion PRT requires input heat $Q_3$ and it releases both output heat $Q_O$ and heat $Q_V$, which should be called lost heat and includes the above-mentioned losses as well as the heat carried along with the process product, which is not recoverable heat $Q_O$; this is schematically shown in FIG. 1a. Since the output heat $Q_O$ generally has a relatively high temperature, for reasons of economy it cannot simply be thrown away (released into the environment, for example).

According to the above-mentioned U.S. Pat. No. 4,402,795, all the output heat $Q_O$ can now be delivered to a heat transformer WT. The input heat delivered to the heat transformer WT is designated as $Q_1^T$; it should be equal to the entire available process output heat $Q_O$, because then all the output heat of the process is utilized, and the maximum heat recovery is assured. The heat transformer WT is designed such that on the one hand it furnishes output heat $Q_2^T$ at such a high temperature that it can be used as process input heat, and the $Q_3$ can be reduced accordingly. Taking a typical case in which lithium bromide and water are the working medium system of the heat transformer, and assuming the realistic value of 0.48 for the efficiency (ratio of input heat to output heat) of the heat transformer, and setting the losses $Q_V=0$, then an energy saving of 48% is calculated, as is plotted on the left-hand ordinate of FIG. 1b.

If only a heat pump WP is used, as is known from U.S. Pat. No. 4,350,571, then all the input energy that the process portion requires can be delivered by means of the heat pump, so that correspondingly less high-grade operating energy is needed. The heat pump requires high-grade input energy $Q_3^P$, and it also accepts a portion $Q_1^P$ of the output heat $Q_O$ of the process and in return furnishes the process portion PRT with all the input heat the process portion requires. This input heat released by the heat pump and delivered to the process portion is designated as $Q_2^P$ in FIG 1a and in quantity is equal to Q. If the conditions prevailing with exclusive use of a heat pump WP operating with LiBr/H$_2$O are calculated, assuming a realistic efficiency of 1.70, then the result is an energy saving of 41%, as shown in FIG. 1b on the right-hand ordinate.

Now if a combination of a heat transformer WT and a heat pump WP is used in the heat supply portion WVT, then the result that should actually be expected is that some degree of energy saving in the range between 48% and 41% would be achieved, as the dashed line in FIG. 1b indicates. After all, when the heat pump and the heat transformer are used simultaneously in the heat supply portion WVT they are not independent of one another, because they must contribute to the output heat $Q_O$ of the process portion. If besides the heat transformer WT a heat pump WP is additionally present in the heat supply portion WVT, the input heat energy $Q_1^T$ of the heat transformer must be reduced in favor of the input heat energy $Q_1^P$ of the heat pump, because it is given that necessarily $$Q_1^T + Q_1^P = Q_O.$$

In other words, input heat of the heat transformer, which enables a theoretical energy saving of 48%, is tapped in favor of the heat pump, which enables a theoretical energy saving of only 41%.

It has now been unexpectedly demonstrated that the efficiency, if the ratio of $Q_1^P/Q_1^T$ increases above zero, does not drop but instead rises, initially to a maximum of 62%, and only then to the lower value of 41%. This surprising effect, which is expressed as a synergistic "reinforcement factor" explained below in conjunction with FIG. 2, can be ascribed to the fact that the heat energy $Q_2^T$ which is transformed upward in temperature by the heat transformer WT travels multiple times through the heat loop and thus through the heat transformer as well, because the heat transformer and heat pump are coupled with one another at least via the heat flow Q in the process portion. The heat transformer and the heat pump can also be thermically coupled directly, in which case the output heat of the heat transformer is then delivered to the heat pump partly or entirely in the form of heat energy $Q^{PT}$. Heat supply portions in which the entire output heat of the heat transformer is supplied to the heat pump, that is, where $Q_1^P$ and $Q_2^T$ are both equal to zero, are shown in FIGS. 6, 7 and 8.

The above-described conditions also apply if the lost heat $Q_V$ is not equal to zero. If the proportion lost is assumed to be 15%, then the output heat of the process portion is reduced accordingly, and thus so is the maximum energy saving that can be attained with the heat transformer; it then amounts to only 41%. If a combination of a heat transformer and a heat pump is used, however, the result is a maximum that corresponds to an energy saving of 56.5%. If the loss proportion is 30%, the saving in primary operating energy for the process that is attainable with the heat transformer alone drops to 34%; yet nevertheless, with the combination of a heat transformer and a heat pump, an energy saving of 51% can still be attained.

A first example of how the principle of the invention as explained in conjunction with FIGS. 1a and 1b can be realized is shown schematically in FIG. 2. The heat supply portion WVT here includes a two-stage heat pump in combination with a two-stage heat transformer, which together include eight exchange units, or in other words only two more than are required for a two-stage heat transformer alone of the type illustrated, which requires six exchange units, or for a heat pump alone of the type illustrated, which would also require six exchange units.

The two-stage heat pump portion WP of the absorber arrangement forming the heat supply portion WVT includes six exchange units A–F, which are combined into a single loop of working medium. The term "exchange unit" is defined in the above-mentioned European patent application, and the manner of illustration, using an (ln p)/(−1/T) diagram, which is used throughout here, is also explained in that patent application. Heat quantity units, which are delivered to an exchange unit, are indicated in FIG. 2 by an arrow pointing to the associated exchange unit; heat units that are removed from an exchange unit are indicated by an arrow pointing away from the associated exchange unit.

A unit of heat energy (hereinafter simply called "heat") at a relatively high temperature $T_3$ is delivered to the exchange unit A operating as a generator. (The term "temperature" here and hereinafter is intended to mean temperature ranges in general.) In the exchange unit B operating as a condenser, one heat unit at a lower temperature $T_2$ is released. The third exchange unit C operates as an evaporator and accepts one unit of heat. In the fourth exchange unit D, which operates as an absorber, one unit of heat at the temperature $T_2$ is also released. The exchange unit E, which operates as a second evaporator (desorber), must in turn be supplied with a heat unit at the temperature $T_2$. In the above discussion as well as hereinafter, the losses that are unavoidable in practice are ignored; this does not affect the principle at all, however.

The heat pump portion is combined with a two-stage heat transformer portion WT, which includes the exchange units C–H and shares the four exchange units C–F with the heat pump portion. G operates as a condenser and H as a generator (desorber). The absorber arrangement resulting from this combination is coupled to the process portion PRT, which requires input heat at the temperature $T_2$ and releases output heat at the temperature $T_1$. The exchange unit A of the heat pump WP is supplied with a heat unit at the temperature $T_3$ from an external heat supply source or operating heat source WQ.

The two-stage heat pump A–F furnishes three units of heat to the process, but it is capable of accepting only two units of heat from the process. The third unit of the heat released by the process is thus available for driving the heat transformer, which then furnishes $1r_{WT}$ heat units at the temperature $T_2$ to the process; $r_{WT}$ is the efficiency of the heat transformer, which is well known to have a value of less than 1. The expectation therefore is a total efficiency r* of $$r^* = Q(T_2)/Q(T_3) = r_{WP} + r_{WT},$$

where $r_{WP}$ is the efficiency of the heat pump. Unexpectedly, the actually attainable efficiency r** is substantially higher, for the following reasons: The heat quantity $1r_{WT}$ furnished at $T_2$ by the heat transformer WT travels through the process and is then available as additional driving heat for the heat transformer. After traveling through the process once more, a further additional heat quantity amounting to $1\ r_{WT}r_{WT} = r_{WT}^2$ is then available, and so forth. If these additional amounts are added up:

$$r_{WT} = r_{WT}^2 + r_{WT}^3 + r_{WT}^4 ...$$

then the result is $r_{WT}/(1-r_{WT})$, which is greater by the "reinforcement factor" $1/(1-r_{WT})$ than the expected contribution $r_{WT}$ of the heat transformer.

The total efficiency r of the heat supply portion is thus in fact $$r^{} = r_{WP} + r_{WT}/(1 - r_{WT}).$$

In FIG. 2, the theoretical efficiency $r_{WT} = \frac{2}{3}$, so that the reinforcement factor for the contribution $r_{WT}$ of the heat transformer is equal to 3. This principle applies generally for the combination of a heat pump and a heat transformer that are coupled via a process. Thus the process receives more input heat and therefore furnishes more output heat as well, so that theoretically, with one primary heat unit at the temperature $T_3$, five heat units at the temperature $T_2$ can be generated. In practice, these ideal conditions are naturally unattainable, but efficiencies (that is, the ratio of the input heat Q [FIG. 1a] required by the process to the actually required operating heat $Q_3^P$) on the order of 3.8 to 4.1 and more are attainable even in actual practice.

The final waste heat is released in the exchange unit G, operating as a condenser, of the heat transformer at a desired low temperature $T_0$ and is accepted by a heat sink WS, such as the ambient air, cooling water or the like. It is particularly advantageous if the waste heat is used for preheating the process material.

Unexpectedly, it is also found that the high efficiency does not have to be achieved at the cost of correspondingly high investment. Quite the contrary: If the ratio of the size of the heat exchanger surfaces in the exchange units to the number of heat units supplied to the plant is assumed to be a rough standard for the investment expense, and if it is assumed that the size of the heat exchanger surfaces is approximately proportional to the sum of the absolute values of the quantities of heat converted in all the heat exchange units of the heat supply portion, then for a one-stage heat transformer the resultant ratio is 4:1=4.0, while the applicable ratio for the plant according to FIG. 2 is equal to 12:5=2.4, or in other words is 40% lower than in the one-stage heat transformer. For actual efficiencies when the working medium system used is LiBr/H$_2$O, the respective ratios are 4.4 and 2.6. The greater complexity of the configuration according to FIG. 2 is thus more than compensated for by the smaller heat exchanger surfaces.

In the following discussion, the vertical arrows at the exchange unit indicate only qualitatively (not quantitatively) whether heat is being supplied to or removed from an exchange unit.

The principle explained above can be realized in the most various ways, and the temperature $T_3$ of the primary operating heat, the temperature $T_2$ of the input heat supplied to the process, the temperature $T_1$ of the heat to be removed from the process and the temperature $T_0$ of the final waste heat and hence the ranges between these temperatures can be selected practically arbitrarily, as will now be demonstrated in terms of exemplary embodiments. For thermodynamic reasons, it always pertains that the efficiency is higher, the greater the difference between $T_3$ and $T_0$ and the smaller the difference between $T_2$ and $T_1$. The primary operating energy can also be supplied entirely or in part in the form of mechanical work W via at least one compressor, as will be explained later in conjunction with FIGS. 73-96.

In the following figures, only the heat supply portion of the plant is shown; the source WQ for the primary operating heat at the temperature $T_3$, or the mechanical work W, the process portion to which input heat at the temperature $T_2$ is supplied and which releases output heat at the temperature $T_1$, as well as the heat sink WS that accepts the waste heat at the temperature $T_0$ are omitted for the sake of simplicity. As explained in the above-identified European patent document, the working medium in the illustration selected here circulates counterclockwise in a heat pump and clockwise in a heat transformer; the function of the various portions of the absorber arrangements is accordingly represented in the schematics by a curved arrow.

FIG. 3 shows a simple embodiment of a heat supply portion, which includes a one-stage heat pump portion WP and a one-stage heat transformer portion WT with a total of six exchange units A-F. The heat transformer portion and the heat pump portion share two exchange units, the exchange units C and D. The exchange unit A, which operates as a generator, is supplied with primary operating heat at the temperature $T_3$. Heat at the temperature $T_2$ for supplying the process, not shown, is taken from the exchange units B and D by means of heat exchangers. The exchange units C and F accept heat at the temperature $T_1$ from the process via heat exchangers, and the final waste heat is produced at the temperature $T_0$ in the exchange unit E.

The heat pump/heat transformer combination shown in FIG. 3 can be modified such that it is capable of furnishing the process with input heat at a plurality of different temperatures and of accepting output heat at a plurality of different temperatures from the process. This is shown by way of example in FIG. 4, which differs from FIG. 3 only in that the exchange units A, B, C, D each operate at higher temperatures than in FIG. 3, so that the temperatures of B and D, and of C and F, no longer coincide. The arrangement according to FIG. 4 furnishes the process, not shown, with input heat at the temperatures $T_{2a}$ and $T_{2b}$, therefore, and accepts output heat at the temperatures $T_{1a}$ and $T_{1b}$ from the process. The other exemplary embodiments, which are described below, can be modified correspondingly as well.

FIG. 5 shows an exemplary embodiment that also includes six exchange units, which form a combination of a one-stage heat pump and a one-stage heat transformer. While the exchange units of FIGS. 3 and 4 are distributed in pairs at three pressure levels, only two pressure levels are provided in FIG. 5, and each level includes three exchange units.

The embodiments shown in FIGS. 6-10 of the heat supply portion of a plant according to the invention are distinguished by a relatively wide range between $T_2$ and $T_1$ and at the same time by a relatively high efficiency. They include only six exchange units.

In the embodiments of FIGS. 6, 7 and 8, the exchange units form a single working fluid loop. These embodiments correspond to the instance mentioned in conjunction with FIG. 1a, in which the heat transformer furnishes all its output heat to the heat pump; that is, $Q_2^T$ and $Q_1^P$ are both equal to zero. The embodiments of FIGS. 7 and 8 differ from one another primarily in terms of the pressure ranges at which the various exchange units operate.

FIGS. 9 and 10 show embodiments for the heat supply portion of a plan according to the invention, which include six exchange units of which two are in a relationship of heat exchange with one another, which is indicated by a wavy arrow. These exchange units, which operate in a temperature range between $T_2$ and $T_1$, accordingly do not need to be in a relationship of heat exchange with the associated process portion. In the embodiments of FIGS. 9 and 10, the temperature levels can be adapted very easily to the conditions dictated by the process portion.

FIG. 9a shows how the absorber arrangement schematically shown in FIG. 9 can be practically realized. The exchange units A-E are indicated in both figures by the same capital letters. Here and in the ensuing exemplary embodiments to be described in further detail, it is assumed by way of example that the arrangement operates with the time-tested working medium system of lithium bromide and water.

The exchange unit A operating as a generator is supplied with primary operating heat, for instance in the form of fresh steam, via a heat exchanger 10. The generator includes a lithium bromide solution that is relatively high in water, from which water is evaporated by means of the heat supplied; this water flows through a working medium gas line 12 to the condenser B, from which the condensed working fluid (water) flows through a line 14 to the exchange unit E operating as an evaporator, which includes a heat exchanger 16 for supplying the process output heat. The evaporated water is absorbed in the absorber F, from whence the heat of absorption is delivered in the form of input heat to the process via a heat exchanger 18. The absorber F communicates via a solution line 20, which includes both a pump 22 and a heat exchanger 24 and carries lithium bromide solution that is relatively high in water, with the generator A. The generator A communicates via a line 26, which carries lithium bromide solution that is relatively low in water and which includes a throttle 27 and passes through the heat exchanger 24, with a spray head disposed in the absorber F. From the absorber F, the lithium bromide solution that is relatively high in water is carried via a line 28, which passes through a heat exchanger 30 and includes a throttle 31, into the exchange unit C operating as an evaporator, in which the condenser B is disposed, so that a heat exchange takes place between the exchange units B and C. The water evaporated in C is condensed in the condenser D, and the waste heat produced there at a low temperature is removed by means of a heat exchanger 32 and for example by means of a cooling tower (not shown).

The throttles 15, 27 and 31 may also be formed by the line itself. This is also true for the other exemplary embodiments.

The condensed water is delivered from D through a line 34, which includes a pump 36, to a spray head 40 disposed in the evaporator E. The exchange unit E may include a recirculation arrangement having a pump 38, in order to recirculate the water it contains by way of the spray head 40. The solution that is relatively low in water is returned from the evaporator C into the absorber F via a line 42 that contains a pump 44.

The absorber arrangement according to FIG. 9a accordingly includes two absorbent or solution loops having the lines 20 and 26, and 28 and 42, respectively. As a result, it is possible to make the temperature difference between the process output heat (at a temperature of approximately 75° C.) supplied to the exchange unit E and the process input heat (at a temperature of approximately 125°–135° C.) delivered by the exchange unit F to the process particularly great. In that case, however, two solution pumps are needed, namely the pumps 22 and 44. Another possibility is to extend the line 42 not into the exchange unit F but rather via the heat exchanger 24 into the exchange unit A; in that case, the solution pump 22 can be omitted.

The temperature and pressure conditions when two solution pumps are used are represented in the diagram of FIG. 9b by heavy lines. If only one solution pump were used, it would operate at the point shown in dashed lines at 44a in the vapor pressure diagram, and the vapor pressure curve of the solution in the line 28 would be located at the point 28a indicated by dashed lines in FIG. 9b. The vapor pressure line corresponding to an $H_2O$ concentration of 0.36, at which the pump 44 operates, would no longer be applicable, and so the absorber F would operate in the lower temperature range of approximately 116–125° C.

FIGS. 13–18 show embodiments of the heat supply portion of a plant in which the difference between $T_2$ and $T_1$ is relatively small but in return the efficiency is very high. The embodiment according to FIG. 13 has the following succession of stages (always beginning at the stage to which the primary operating energy is delivered): heat pump (WP) - heat pump (WP) - heat transformer (WT). The heat is released to and accepted from the process portion at temperatures $T_2$ and $T_1$, respectively, which are relatively close to $T_0$. The difference between $T_3$ and $T_2$ is correspondingly great. In the heat pump stage operating at the highest pressures and temperatures, two exchange units are thermically coupled.

Figure 13:
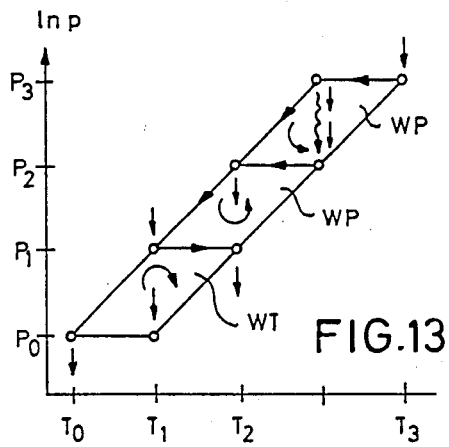
Figure 15:
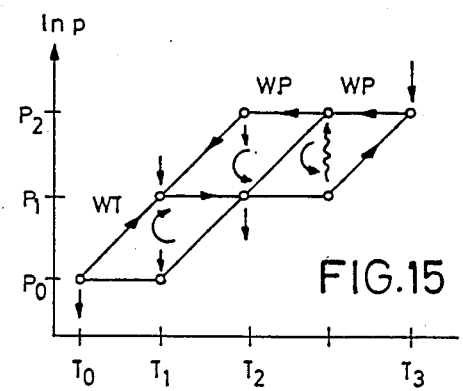

The embodiment of FIG. 15 has the same succession of stages, WP-WP-WT, as the embodiment of FIG. 13. While the exchange units of the two heat pump stages in FIG. 13 operate at three different pressure levels, the exchange units of the heat pump stages of FIG. 15 operate at only two pressure ranges.

Figure 14:
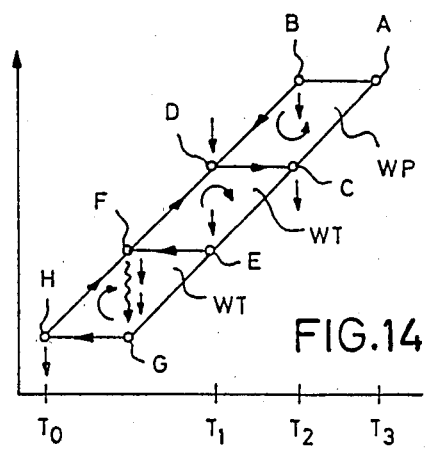
Figure 16:
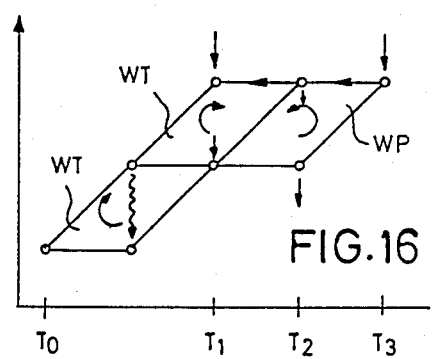

FIGS. 14 and 16 show embodiments of the heat supply portion of a plant according to the invention in which the succession of the stages is WP-WT-WT. Here the temperatures $T_2$ and $T_1$ are close to the temperature $T_3$ of the primary operating heat supplied to the plant. In these embodiments, two exchange units of the heat transformer stage operating at the lower temperatures are thermically coupled.

Figure 14A:
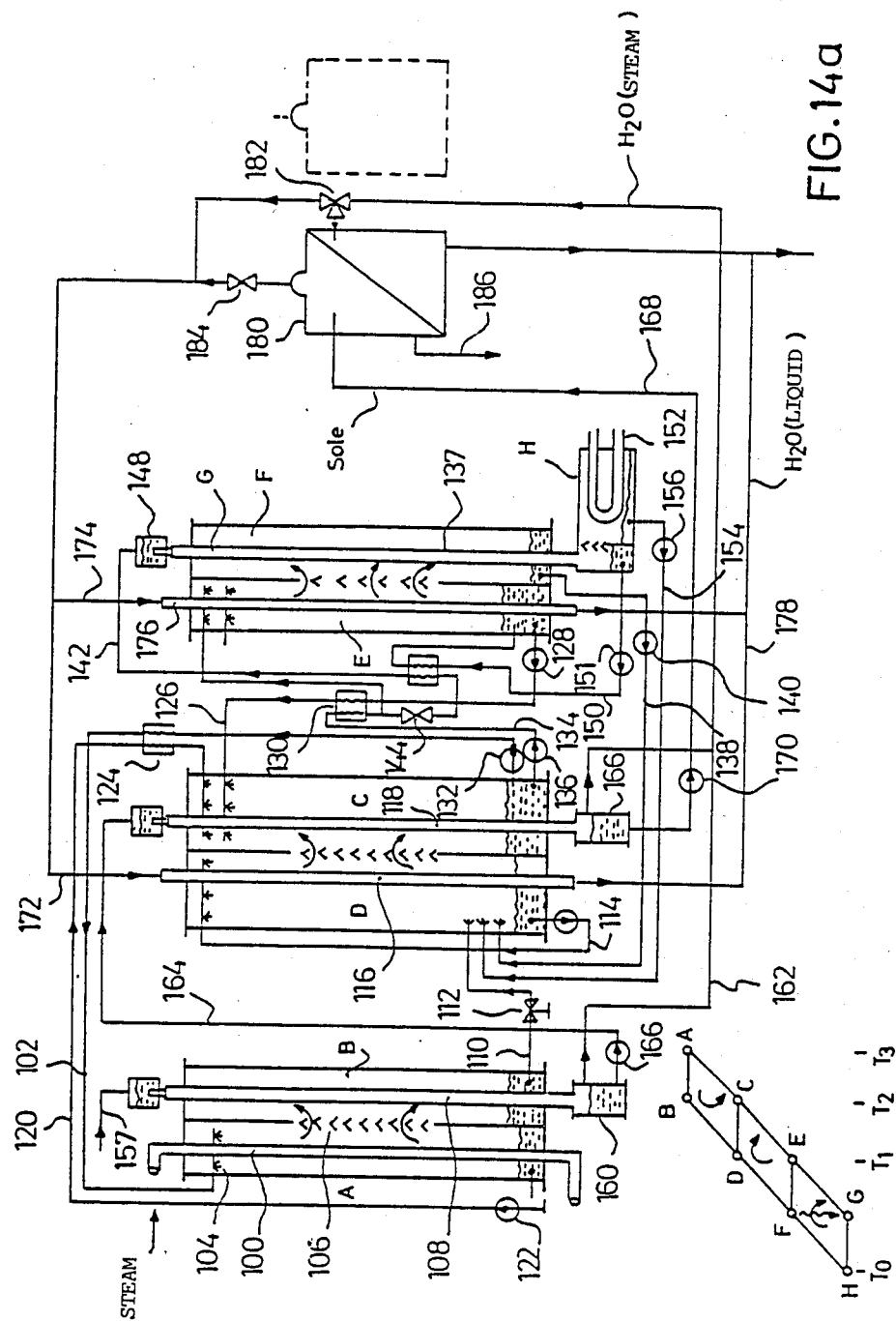

In FIG. 14a, a plant is shown in simplified form, which includes a heat supply portion of the type shown in FIG. 14 and is designed for the distillation of water, for instance for desalination of sea water. The exchange units take the form of towers, in which the fluids flow in a substantially vertical direction and the liquid flows downward in the form of a thin film on the surfaces of the heat exchanger elements. The heat exchanger elements included in the various exchange units may contain nests of tubes, which will be explained below in conjunction with FIG. 41h. FIG. 14a, for the sake of simplicity, shows only one tube of each heat exchanger tube nest. Instead of nests of tubes, naturally other heat exchanger elements may be used.

The exchange unit A operating as a generator is supplied with primary operating heat, for example in the form of hot steam, via a heat exchanger element 100. The exchange unit A is also supplied, via a line 102 that discharges into a spray head arrangement 104, with lithium bromide solution that is relatively high in water, which then flows downward along the heat exchanger element 100, whereupon water evaporates and lithium bromide solution that is relatively low in water collects at the bottom of the generator. The water vapor generated in the generator A flows through a baffle plate arrangement 106 into the exchange unit B operating as a condenser, where the water vapor condenses at a heat exchanger element 108 and releases the heat of condensation to it. The water collecting in the condenser B flows through a line 110, which includes a throttle 112, and into the exchange unit D, which operates as an evaporator. The evaporator D is preferably provided, in a known manner, with a recirculating arrangement 114, which includes a pump and a spray head. A heat exchanger element 116 which furnishes the heat required for the evaporation is disposed in the evaporator D. The water vapor generated in the evaporator D flows into the exchange unit C operating as an absorber, where it is absorbed by lithium bromide solution that is relatively low in water and releases the heat of absorption to a heat exchanger element 118. The lithium bromide solution that is low in water is delivered in the absorber C from the generator A, on the one hand, via a line 120 that includes a pump 122 and leads through a heat exchanger 124, and on the other hand flows from the exchanger unit E, operating as a second generator, via a line 126 that includes a pump 128 and passes through a heat exchanger 130. The high-water lithium bromide solution produced in the absorber C is supplied on the one hand to the generator A via the line 102, which contains a pump 132 and passes through the heat exchanger 124, and on the other hand to the second generator E or to the generator G, via a line 134 which includes a pump 136 and passes through the heat exchanger 130 and branches into two lines 134a and 142. The water vapor generated in the second generator E is delivered to the exchange unit F operating as a second condenser, where it condenses at a heat exchanger element 137, which on its interior forms the exchange unit G operating as a desorber. In the desorber G, the lithium bromide solution supplied to it from the absorber C via the line 142 is concentrated further by the evaporation of water. The line 142 includes a regulating valve 144, leads through a heat exchanger 146 and discharges in the desorber G via an arrangement 148, which effects a distribution of the supplied solution in a thin, uniform film over the surface of the heat exchanger element forming the desorber G.

The low-water solution generated in G is delivered via a line 140, which passes through the heat exchanger 146, to the sump of the second generator E and from there is pumped on by the pump 128. The water vapor is condensed in the exchange unit H of the heat transformer portion. The heat of condensation produced at overly low temperatures $T_0$ is waste heat and is removed via a heat exchanger element 152, which may for instance communicate with a cooling tower (not shown) or the like or may serve to heat the water that is to be desalinated.

The water condensed in H is supplied via a line 154, which includes a pump 156, to the evaporator D.

The process portion described below and serving to effect desalination of water is structurally integrated into the above-described heat supply portion, although there is no fluid communication between the heat supply portion and the process portion.

The salt water that is to be processed, which has been prepared in the usual manner (in particular, decalcified), is introduced via an input line 157 and an arrangement corresponding to the arrangement 148 into the heat exchanger element 108 located in the condenser B and there is heated by the heat of condensation arising in the exchange unit B, producing water vapor and concentrated brine. The water vapor is the desired process product and is removed from the upper part of a collecting container 160 through a vapor line 162. The concentrated brine is fed via a line 164 which includes a pump 166 to the heat exchanger element 118, which is located in the absorber C and is heated by the heat of absorption. Once again, water vapor is produced, which is delivered from a collecting container 166 to the vapor line 162, while the further-concentrated brine is removed via a line 168 which contains a pump 170, or according to a preferred embodiment of the invention is subjected to at least one further distillation process, as will be explained later on.

The water vapor in the line 162 has the temperature $T_2$ minus the temperature drop at the heat exchangers 108 or 118, and its heat content is used to meet the need for heat of the evaporator D and of the second generator E. To this end, the line 162 can be connected to input lines 172 and 174 of the heat exchanger 116 disposed in the evaporator D or to a heat exchanger element 176 disposed in the second generator E, where the water vapor condenses to become pure liquid water, which is supplied for the intended usage via a water collecting line 178.

If the pressure difference prevailing in a line is sufficient for pumping the particular fluid involved, the associated pump (for instance pump 122, 136, 144, 166, 170) may be replaced by a regulating device.

Figure 14B:
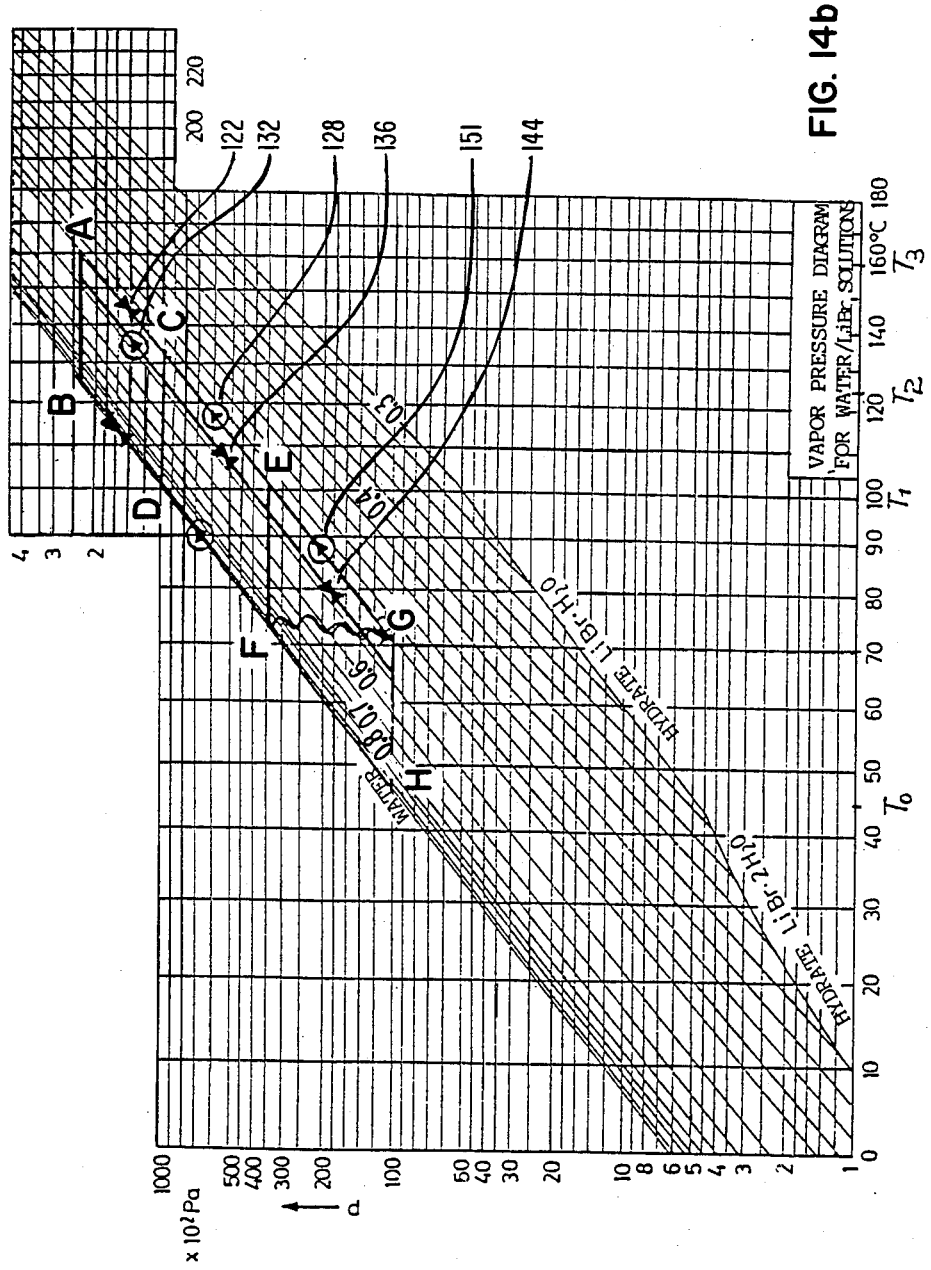

As shown in FIG. 14b, under typical operating conditions the water vapor in B and C is produced at a temperature of approximately 120° C., while the exchange units D and E require input heat at a temperature $T_1$ of only 100° C. A certain temperature difference, for instance of 5° to 7° C., between the input heat of the exchange units D and E and the heat at which the water vapor is generated is useful, because the heat exchanger surfaces and hence the plant can be kept smaller, the greater this temperature difference. However, a difference of 13° to 15° C. always still remains, which can be exploited advantageously by not connecting the vapor line 162 to the input lines 172 and 174 directly, but instead incorporating one or more distillation columns 180 of a conventional type in between, which can operated by the so-called multi-stage method and require a temperature difference of approximately 3° to 6° C. to operate. The brine is then fed via the line 168 into the distillation column arrangement, which is shown only schematically in FIG. 14a. The distillation column arrangement is also connected, via a three-way valve 182 and a stop valve 184, in series between the vapor line 162 and the input lines 172, 174. The brine finally resulting in the distillation column arrangement is removed via a line 186; the pure water that results is fed into the water collecting line 178. Since the usable temperature range is above 100° C., the additional distillation columns can operate in the range of atmospheric pressure.

With the plant described, an efficiency of approximately 3.4 is attainable, without the distillation column arrangement 180, with respect to the primary heat at the temperature $T_3$ supplied to the generator A. If a distillation column 180 is also used, this efficiency is doubled; if two distillation columns are used, it is tripled, and so forth. The efficiency of the plant with respect to the primary energy requirement is comparable, even without the distillation columns 180, to that of the best known plants operating with exhaust vapor compression.

Heat transformation in the exchange units D and E is three times as great as in the exchange units A, B, C and F, which is represented by showing the applicable units as larger in size. In practice, a pump in a water or solution line can be replaced by a simple regulating valve, if the pressure difference at the associated line is sufficient to assure the required throughput of liquid. The number of solution pumps can also be reduced, at the cost of efficiency, or the temperature difference $T_2-T_1$ can be decreased, as has been explained in conjunction with FIG. 9a.

Figure 9:
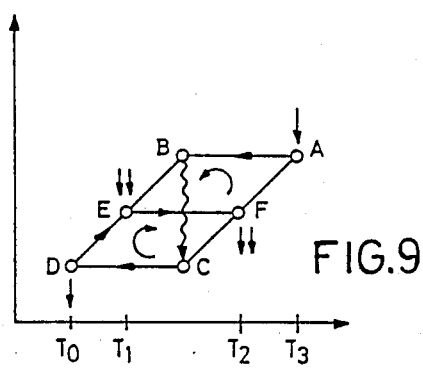
Figure 10:
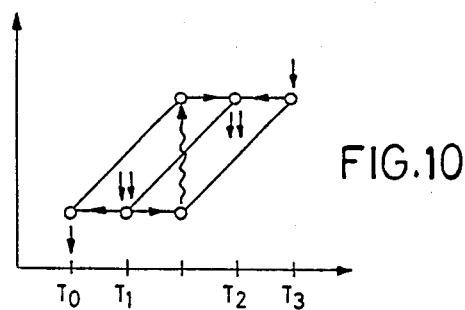
Figure 11:
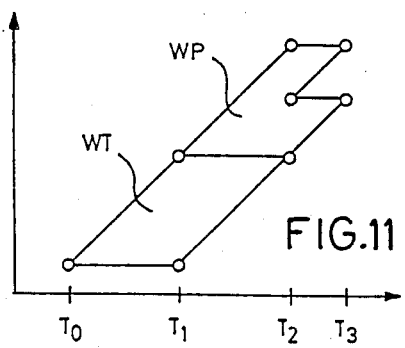
FIG. 11 shows an embodiment of the heat supply portion which includes a two-stage heat pump portion WP and a one-stage heat transformer portion WT.
Figure 12:
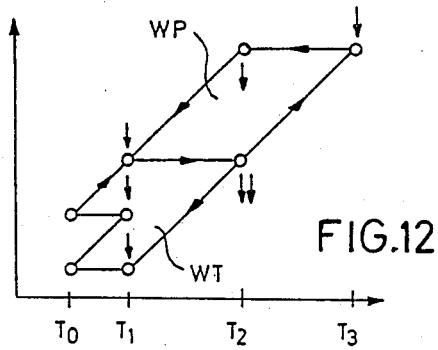
FIG. 12 shows an embodiment of the heat supply portion which includes a one-stage heat pump portion WP and a two-stage heat transformer portion WT.
Figure 9A:
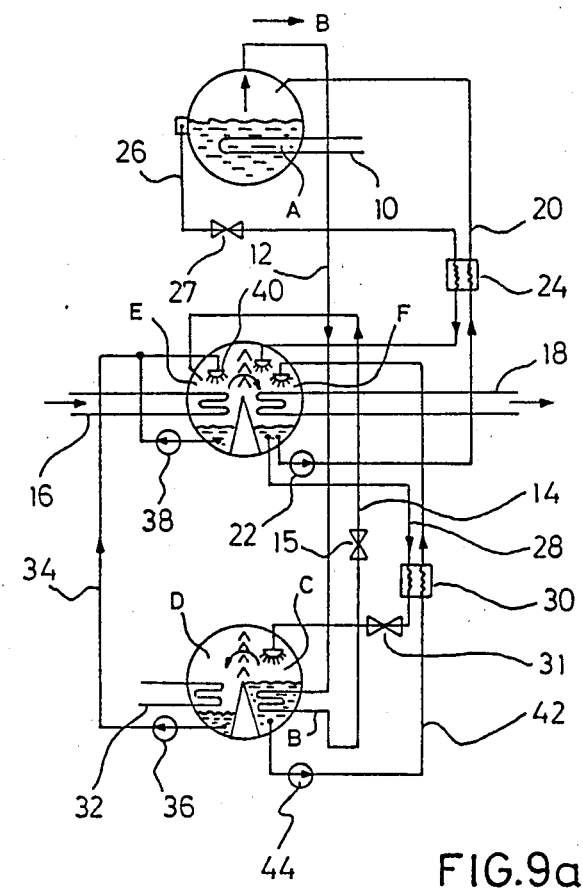
Figure 9B:
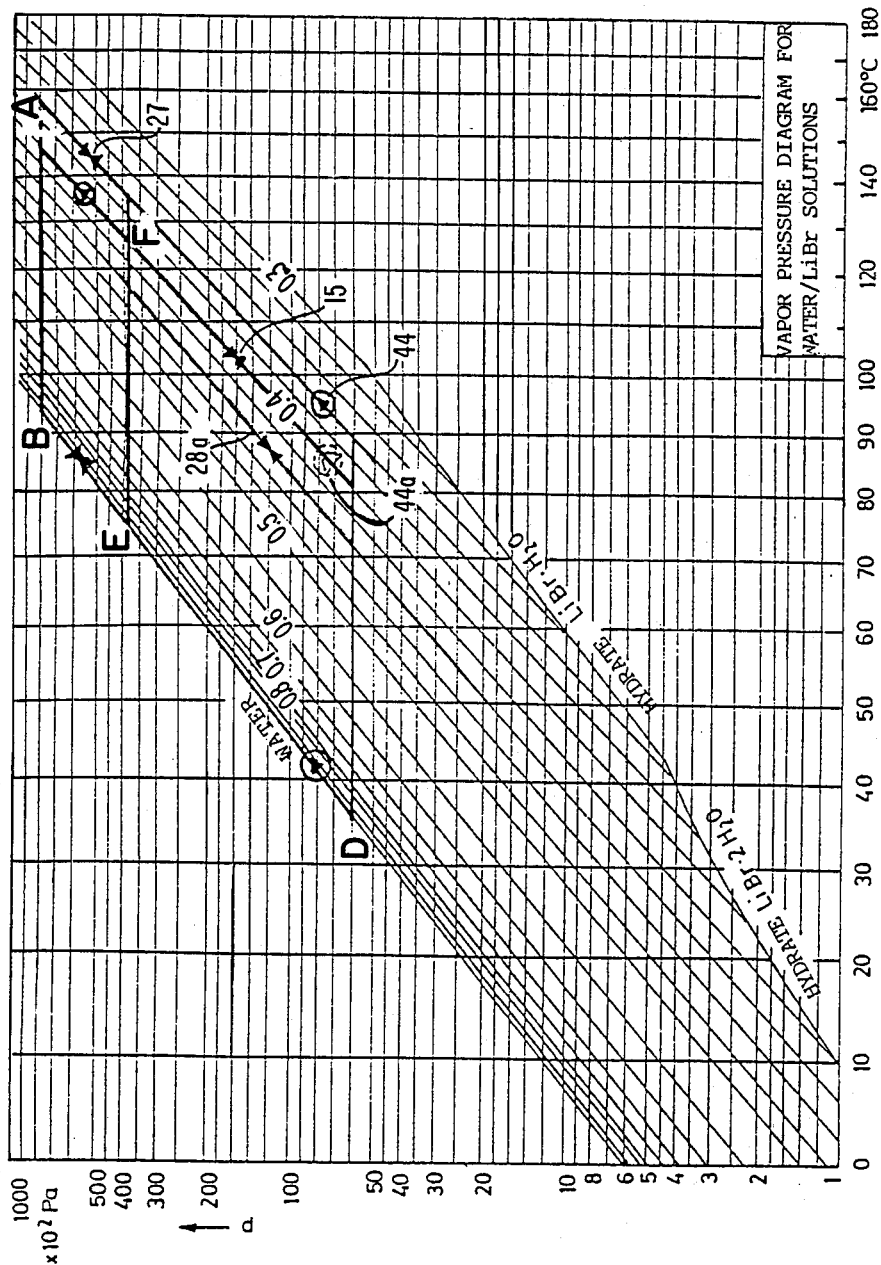

FIG. 14b is by way of example a vapor pressure diagram corresponding to FIG. 9b for the heat supply portion of the plant according to FIG. 14a. As mentioned above, the working medium system is LiBr/-H$_2$O.

Figure 17:
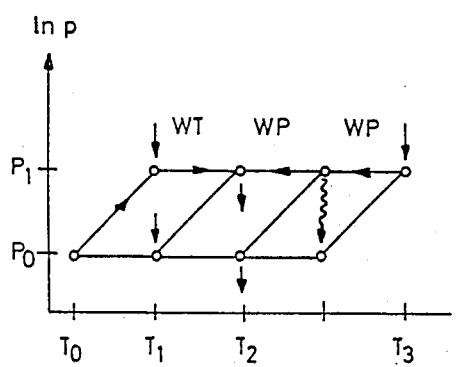
Figure 18:
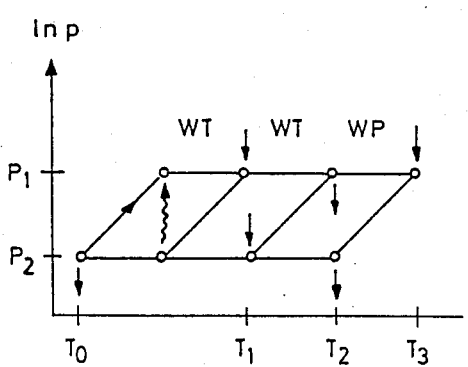

FIGS. 17 and 18 show two embodiments in which the stages are in the order WP-WP-WT and WP-WT-WT, respectively, in which the exchange units operate in only two different pressure levels. In FIG. 17, similarly to FIGS. 13 and 15, the relatively narrow temperature range $T_2-T_1$ is relatively close to $T_0$, while in FIG. 18, similarly to FIGS. 14a and 16, this temperature range is close to $T_3$. These plants are suitable for the working medium system NH$_3$/H$_2$O.

Figure 19:
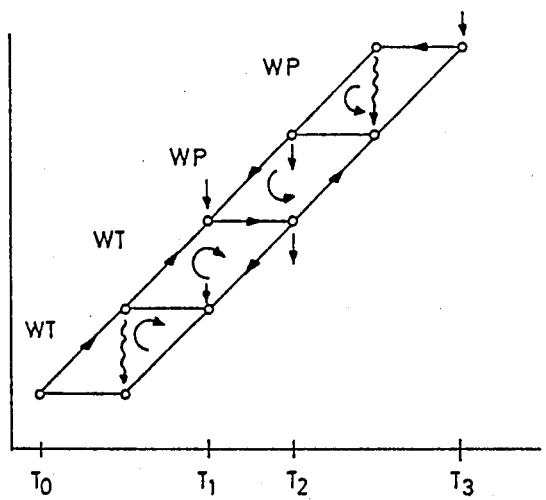
Figure 20:
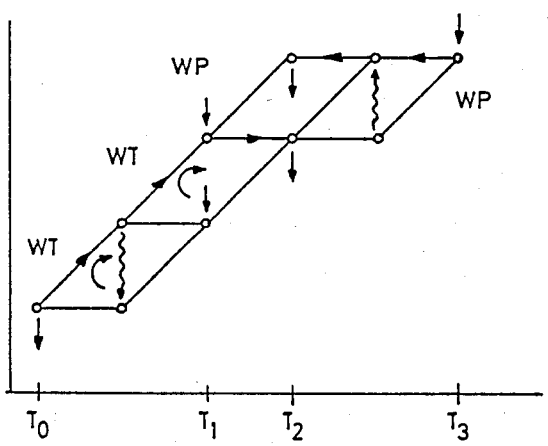
Figure 21:
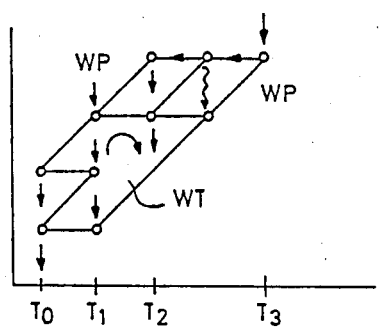

FIGS. 19–21 show four-stage heat supply portions for a plant according to the invention. In FIGS. 19 and 20, the succession of stages is WP-WP-WT-WT in both cases. The temperature interval $T_2-T_1$ is approximately in the middle between $T_3$ and $T_0$. In the uppermost stage in terms of temperature and in the lowermost stage in terms of temperature, two exchange units in each are in a relationship of internal heat exchange with one another. In FIG. 21, the two-stage heat transformer portion WT includes only a single loop of working fluid. Here, the temperature interval $T_2-T_1$ is close to $T_0$, so that these plants are particularly suitable for the separation of temperature-sensitive substances.

Figure 23A:
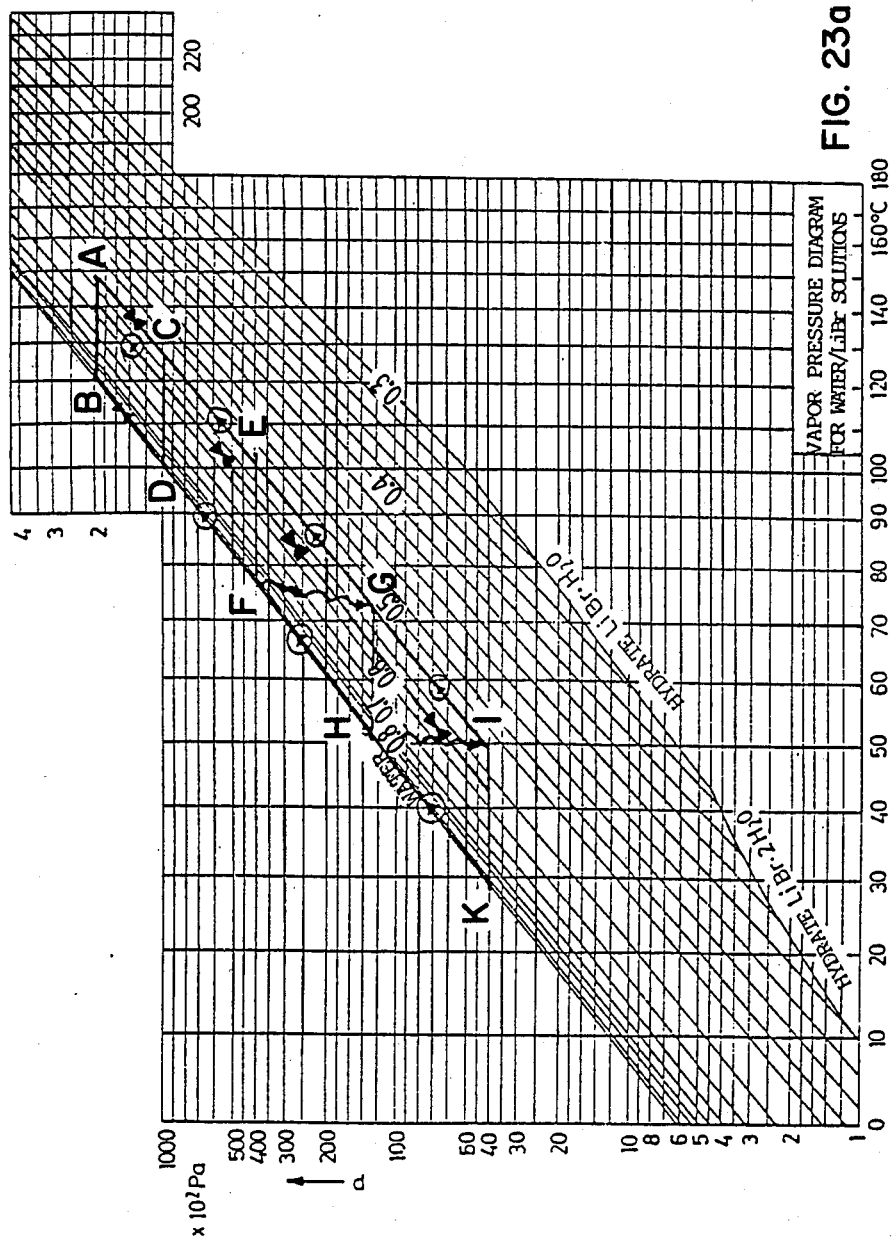

The four-stage absorber arrangements shown in FIGS. 22 and 23 each have ten exchange units, which operate in pairs at five different pressure ranges. In FIG. 22 the succesion of stages is WP-WP-WP-WT, and in FIG. 23 it is WP-WT-WT-WT. FIG. 23 is similar to FIG. 14 and differs from it substantially only in having two further exchange units I and K, which with the exchange units G and H form a heat transformer circuit, in which H and I are in heat exchange with one another. The vapor pressure diagram for the absorber arrangement shown in FIG. 23 is shown in FIG. 23a. The arrangement according to FIG. 23 is supplied with a unit of operating heat at the exchange unit A operating as a generator. The exchange unit B furnishes one unit and the exchange unit C furnishes four units of heat at the temperature $T_2$ to the process portion, not shown. The exchange unit D accepts four units of process output heat and the exchange unit E accepts one unit of process output heat at the temperature $T_1$ from the process, and the exchange unit K releases one unit of waste heat to the environment. In comparison with FIG. 14, the temperature difference $T_2-T_1$ is somewhat smaller, namely 20° C. instead of 25° C., and in return the efficiency is higher, namely approximately 4 to 4.2. The arrangement according to FIG. 23 can be operated similarly to that of FIG. 14a.

FIGS. 24 and 25 show four-stage absorber arrangements having only four pressure levels. The succession of the stages is WP-WP-WP-WT and WP-WT-WT-WT, respectively. In the first case, the temperature interval $T_2-T_1$ is at low temperatures, that is, in the vicinity of $T_0$, while in the case of FIG. 25 this temperature interval is high, that is, in the vicinity of $T_3$.

In FIGS. 26–29, absorber arrangements are shown that are distinguished by a particularly large interval between $T_2$ and $T_1$. In all these arrangements, two exchange units are in a relationship of heat exchange with one another. This heat exchange may be complete, but it need not necessarily be so; that is, in FIGS. 26 and 27, at a temperature $T_z$ located between $T_2$ and $T_1$ heat can be supplied or removed, depending on how the heat exchange is designed.

Figure 6:
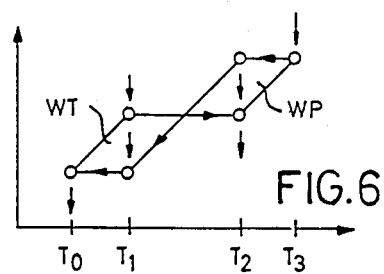
Figure 26:
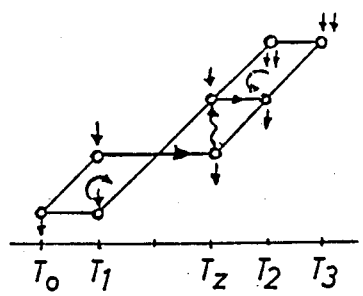
Figure 27:
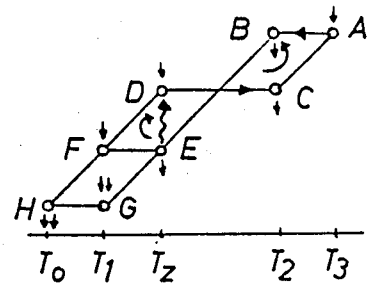
Figure 27A:
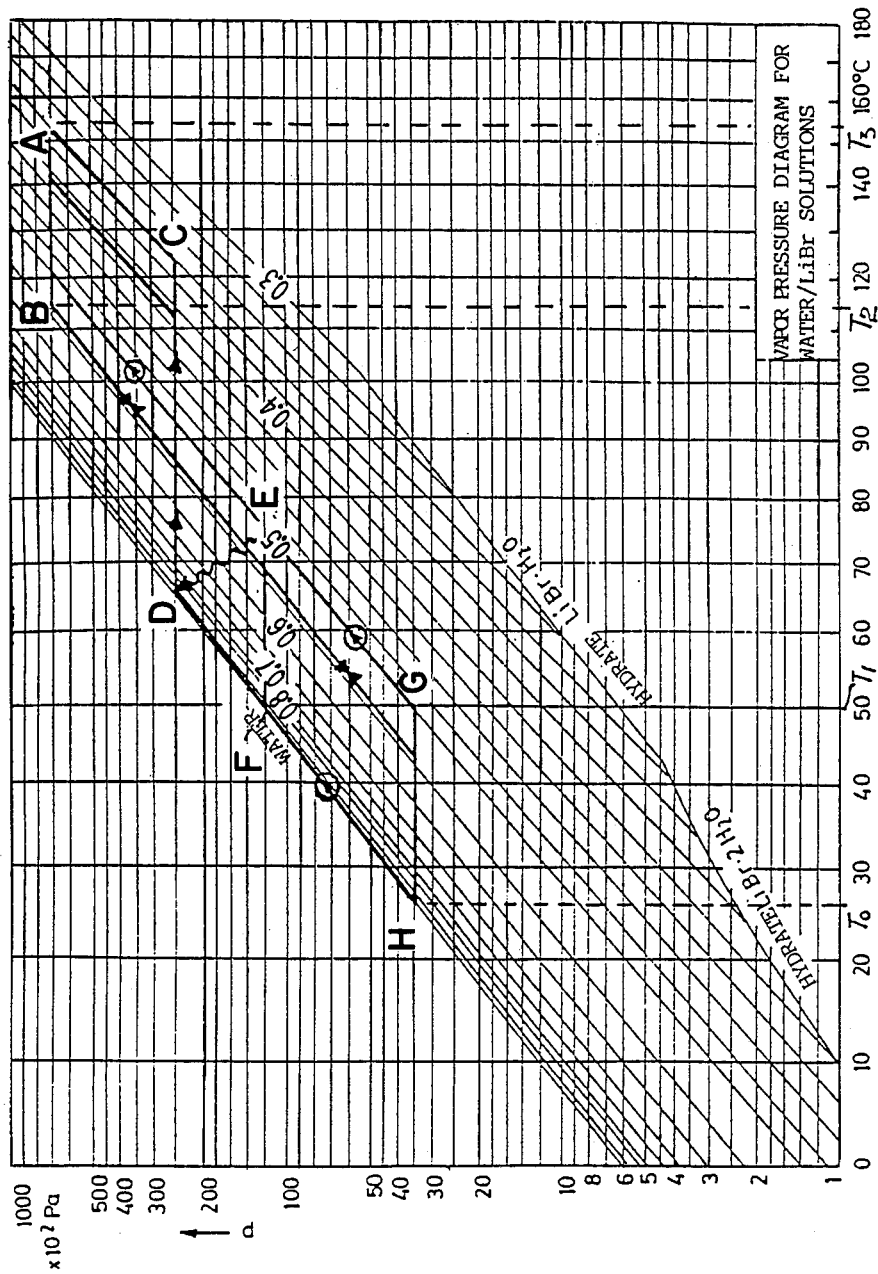

The absorber arrangements of FIGS. 26 and 27 include a heat pump/heat transformer combination having a single loop of working fluid as shown in FIG. 6. In FIG. 26, this combination is preceded by a single heat pump circuit, which shares two exchange units with the combination. In FIG. 27, the combination is followed by a single heat transformer circuit, which shares the exchange units E and F with the combination. A vapor pressure diagram for the absorber arrangement shown in FIG. 27 is provided in FIG. 27a. The interval $T_2-T_1$ here ammounts to $113-50=63°$ C., so that this plant is well suited for example for drying paper or brown coal that is heated in power plants.

Figure 7:
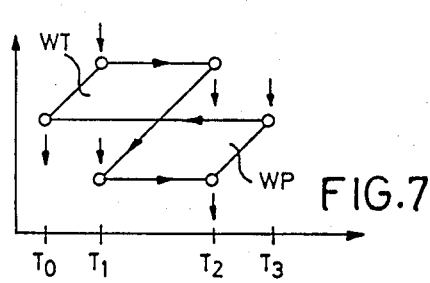
Figure 8:
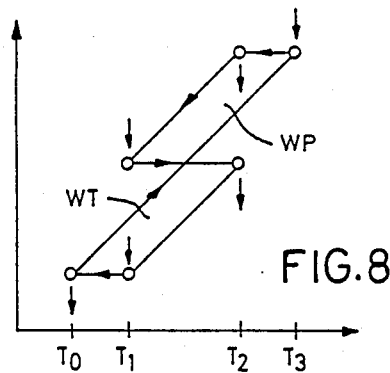
Figure 28:
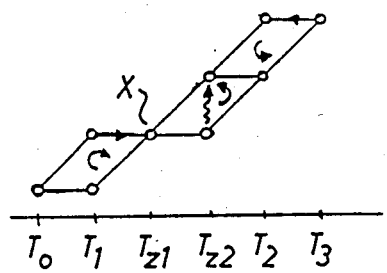
Figure 29:
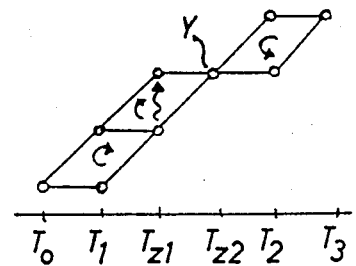

The absorber arrangements according to FIGS. 28 and 29 differ from those of FIGS. 26 and 27, respectively, in having an additional exchange unit X and Y, respectively. The throughput of working fluid can now be selected largely freely in all three stages, and heat can also be removed or supplied in one additional temperature range $T_{z1}$ or $T_{z2}$. The configuration of FIGS. 6, 7 and 8 can also be modified by means of an additional exchange unit X or Y of this kind.

FIG. 30 shows a further exemplary embodiment of an absorber arrangement, which can accept heat from the process or release heat to the process at a temperature range $T_{z1}$ located between $T_2$ and $T_1$. FIG. 31 shows an exemplary embodiment of an absorber arrangement which can release heat to the process or accept heat from the process in a temperature range $T_{z2}$ located between $T_2$ and $T_1$. Here again, the heat exchange, represented by a wavy arrow, is not complete; that is, in FIG. 30 the exchange unit releasing the heat does not have to furnish all the heat that the heat-accepting exchange unit requires. The situation is equivalent for the absorber arrangements of FIGS. 32–35; here again, with incomplete heat exchange an additional temperature range $T_z$ is available for the acceptance of heat from the process or the release of heat to the process.

Figure 38:
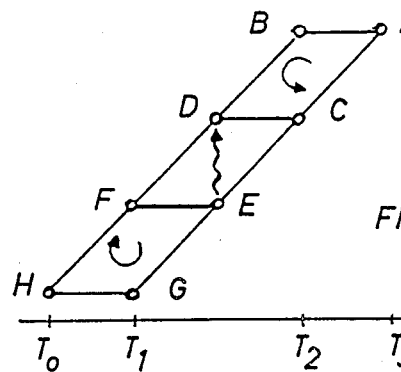

FIGS. 36–38 show further exemplary embodiments having different locations of the various temperature ranges. The plant according to FIG. 38 can be modified by omitting the connections between D and F and between C and E, given that there is complete heat exchange between E and D.

FIGS. 39a–39i and 39k–39r show a series of heat pump configurations having increasingly high efficiency, which can be used to advantage in a plant according to the invention. Of all the configurations in FIG. 30, that of FIG. 39a has the lowest efficiency, and those of FIGS. 39p and 39q have the highest efficiency. With increasing efficiency, however, the number of exchange units and thus the expense for equipment increases. There are many applications, however, in which one of these two factors is decisive, and it is a great advantage of the present invention that an optimal configuration is available for each specialized case.

FIGS. 40a–40i and 40k–40r show heat transformer configurations having increasingly high efficiency. By combining a heat transformer portion according to FIG. 40 with a heat pump portion according to FIG. 39, advantageous plants according to the invention can be realized. Either one of the heat pump configurations can be selected as a starting point and can be augmented with a heat transformer portion, or an advantageous heat transformer configuration can be the point of departure and can then be combined with a suitable heat pump configuration.

FIGS. 41–45 show how the heat pump configuration of FIG. 39b can be combined with a heat transformer portion. The configuration of FIG. 39b is emphasized here by thicker dashes. It is applicable in general that particular advantages are attained if the combined heat transformer and heat pump configuration has as many exchange units as possible in common. For instance, a combination shown in FIG. 68 of the configurations of FIGS. 39q and FIG. 40q has only one more exchange unit than does one of these configurations alone.

Figure 40D:
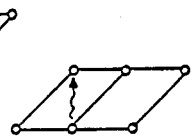

In FIG. 41, the heat pump of FIG. 39 is combined with the simplest heat transformer, according to FIG. 40a, which includes four exchange units, three of which it shares with the heat pump. FIG. 42 shows a combination of the heat pump of FIG. 39b with the heat transformer of FIG. 40c. FIG. 43 shows a first combination of the heat pump according to FIG. 39b with the heat transformer of FIG. 40b. FIG. 44 is a combination of FIG. 39b and FIG. 40d, and FIG. 45 is a second possible combination of FIG. 39b with FIG. 40b.

Figures 41A, 41B, 41C, 41H:
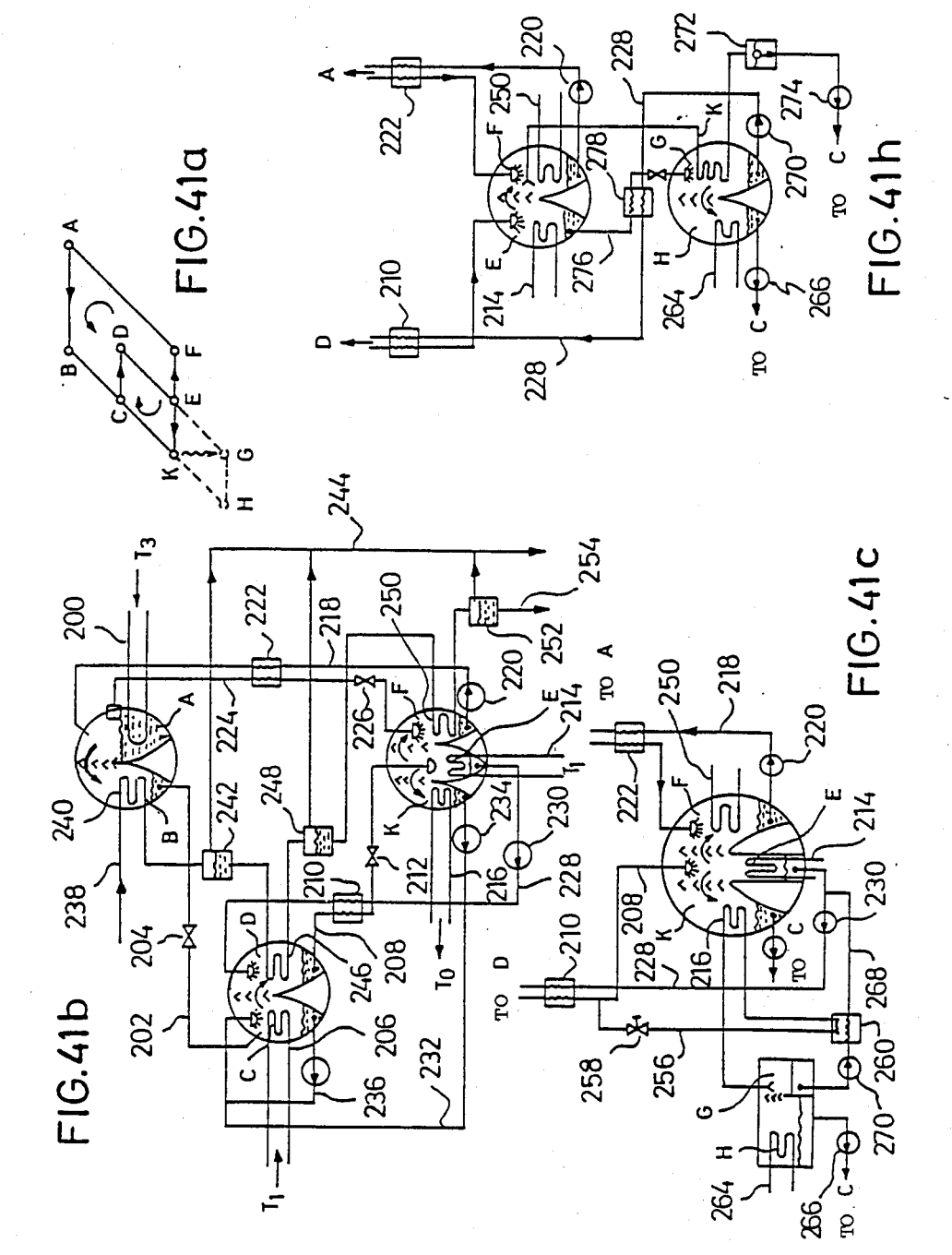
Figure 41E:
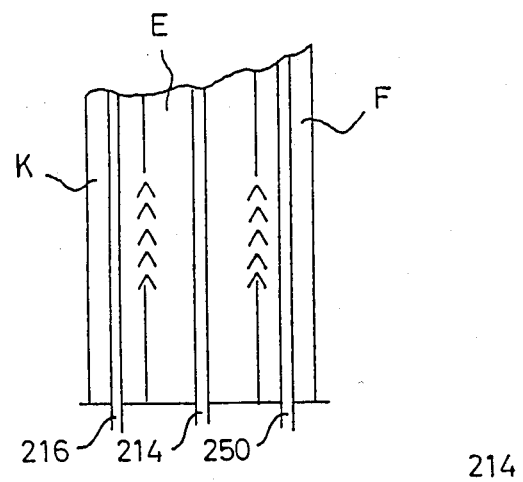

With the aid of FIGS. 41a–41i, it will now be explained how the absorber arrangements of FIGS. 41 and 42 can be practically realized. In FIG. 41a, the schematic of FIG. 41 is shown once again, and the exchange units are identified as A–K. FIG. 41b, in simplified form, shows how the arrangement having the exchange units A–K can be realized if the plant is to be accommodated in a space having a limited height. The exchange units in that case are not columnar as in FIG. 9a but instead have a substantially horizontal, elongated housing, as shown by way of example in section in FIG. 41b.

The exchange unit A, operating as a generator, includes a heat exchanger element 200 for supplying the primary operating heat at the temperature $T_3$. The resultant water vapor is condensed in the condenser B; the resultant water flows via a line 202, which includes a throttle 204, into the evaporator C, to which heat at the temperature $T_1$ is supplied via a heat exchanger element 206. The evaporated water is absorbed in the absorber D. The resultant high-water solution in the absorber D flows via a line 208, which leads through a heat exchanger 210 and includes a throttle 212, into the second generator E, to which heat at the temperature $T_1$ is supplied from the process via a heat exchanger element 214. The steam that is generated is partly absorbed in the second absorber F and partly condensed in the second condenser K, which includes a heat exchanger element 216, by way of which the resultant heat of condensation at the temperature $T_0$ (waste heat) is removed. The high-water solution produced in the absorber F is introduced into the first generator A via a line 218, which includes a pump 220 and passes through a heat exchanger 222. From the generator A, a solution relatively low in water is introduced via a line 224, which passes through the heat exchanger 222 and includes a throttle 226, and via a spray head into the absorber F. From the second generator E, relatively low-water solution is introduced into the absorber D via a line 228, which includes a pump 230 and leads through the heat exchanger 210. From the second condenser K, the condensed water is introduced via a line 232, which includes a pump 234, into the evaporator 206, which is provided with a recirculation arrangement 236. If the plant is used for water desalination, similarly to that of FIG. 14a, then the prepared untreated water is supplied via a line 238 to a heat exchanger element 240 disposed in the condenser B, where water vapor is generated by means of the heat of condensation. The water vapor is separated from the brine in a vessel 242 and delivered to a vapor collecting line 244. The brine is carried out of the vessel 242 through a heat exchanger element 246 disposed in the absorber D, where once again steam is produced, which in a second vessel 248 is separated from the remaining brine and is delivered to the vapor collecting line 244. The brine from the vessel 248 is delivered to a heat exchanger element 250, which is located in the second absorber F. The resultant vapor is separated from the brine in a vessel 252 and delivered to the vapor collecting line 244. The brine is removed from the vessel 252 via a line 254. The lines 244 and 254 correspond to the lines 162 and 168, respectively, in FIG. 14a and like them can lead to one or more distillation columns, not shown in FIG. 14b, from which then vapor at a correspondingly low condensation temperature is introduced into the heat exchanger elements 206 and 214.

By adding two further exchange units G, H, the absorber arrangement of FIG. 41 can be made into the abosrber arrangement of FIG. 42, as indicated with dashed lines in FIG. 41a. One possibility for realizing these additional exchange units is shown in FIG. 41c. A portion of the solution high in water from D is supplied via a line 256, which includes a valve 258 and leads through a heat exchanger 260, to the exchange unit G operating as a desorber through a heat exchanger element 216 disposed in the condesner K. The vapor that is generated by means of the heat of condensation supplied via the heat exchanger element 216 is condensed in the exchange unit H operating as a condenser; the heat of condensation at the temperature $T_0$ is delivered to a cooling tower or the like. The condensed water is fed from H into the condenser C via a pump 266. The relatively low-water solution from the desorber G is supplied via a line 268, which includes a pump 270 and leads through the heat exchanger 260, to the intake side of the pump 230. The remaining portion of the plant, not shown in FIG. 41c, may be embodied as described for FIG. 41b.

Figures 41D, 41F, 41G:
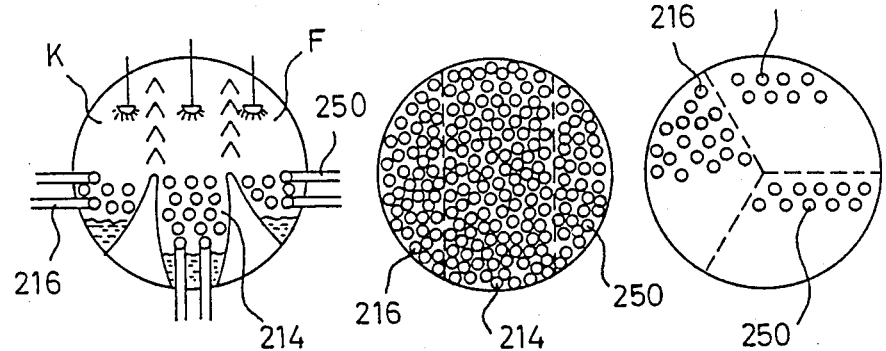
Figure 4I:
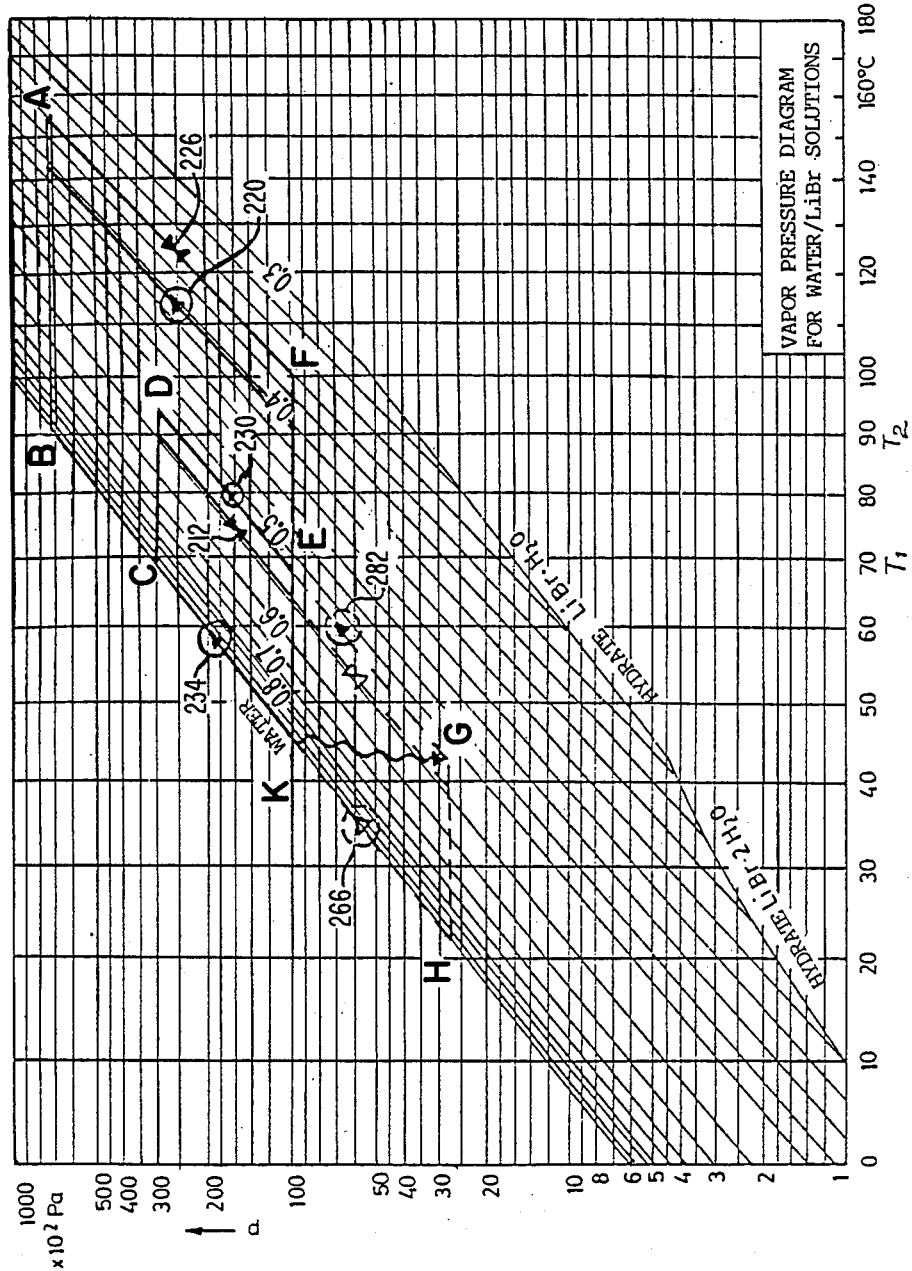

In FIG. 41c, a triple exchange unit E-F-K is needed, which may be embodied in the manner shown in greater detail in FIG. 41d. The heat exchanger elements 214, 250 and 260 may comprise coils or nests of tubes, as shown.

If the floor space occupied by the plant is limited, and if instead of exchange units having horizontally elongated housings, exchange units in the form of columns are to be used, then a configuration such as that shown in vertical section in FIG. 41e and in cross section in FIG. 41f can be used. In FIG. 41e, the heat exchanger units 214, 250 and 216 are each represented symbolically by only a single tube; in actual practice, they may be nests of tubes, as shown in section in FIG. 41f. The nests of tubes may be disposed in various sectors of the tubular housing, as shown in FIG. 41g.

FIG. 41h shows a portion of the plant corresponding to FIG. 41c, in which only double exchanger units are needed and the pump 230 is dispensed with. Here, the condenser K fed with vapor from E is accommodated as a heat exchanger element in the exchange unit G, which is located in the same housing as the exchange unit H. The condensed water from K is carried via an equalizing vessel 272 and a pump 274 into the evaporator C. The exchange units E and F share a second housing. The low-water solution from E is fed via a line 276, which leads through a heat exchanger 278 and includes a throttle, into the desorber G. The relatively low-water solution from the desorber G is introduced via the line 228, which includes the pump 270 and leads through the heat exchanger 278, into the absorber D. The remaining portions of the plant are embodied as described in conjunction with FIG. 41b.

FIG. 41i shows the vapor pressure diagram for the absorber arrangement according to FIG. 41b in solid lines and that for the expanded unit according to FIG. 41c in dashed lines. As the diagram showsn, by means of the additional exchange units G and H, the waste heat temperature is reduced from somewhat above 45° C. in the arrangement of FIG. 41b to somewhat above 20° C. in the arrangement of FIG. 41c, and this is associated with a corresponding improvement in efficiency.

Figure 43A:
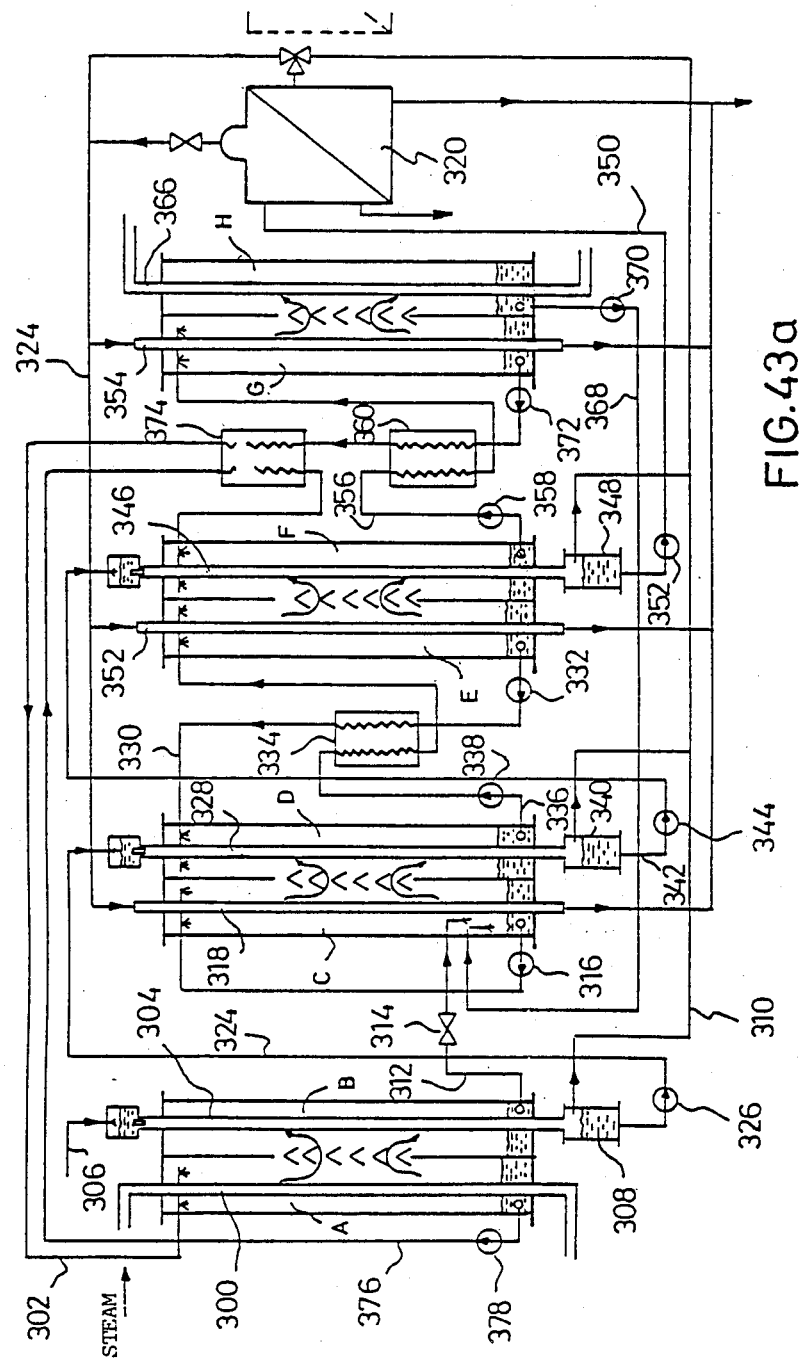

In FIG. 43a, a plant is shown in greater detail, which includes a heat supply portion according to FIG. 43 and can for instance be used for desalinating water. The exchange unit A operating as a generator is supplied with operating heat at the temperature $T_3$, for example in the form of hot steam, via a heat exchanger unit 300. Also fed into the generator A is lithium bromide solution having a relatively high water content, via a line 302. The resultant vapor condenses in a heat exchanger element 304, to which prepared, untreated water is supplied, disposed in the condenser B. The vapor produced in the heat exchanger element 304 is separated in a vessel 308 from the brine and supplied to a vapor collecting line 310. The water condensed in the condenser B is carried via a line 312, which contains a throttle 314, into the exchange unit C operating as an evaporator, which is provided with a water recirculating arrangement 316. The heat of evaporation is supplied by a heat exchanger element 318, which is disposed in C and is heated by the condensation of vapor which is delivered to it either directly via the line 310 or, as in FIG. 14a, via one or more distillation columns 320 and a line 324.

The brine from the vessel 308 is carried via a line 324, which contains a pump 326, into a heat exchanger element 328, which is disposed in the exchange unit D operating as an absorber and is heated by the heat of absorption generated upon the absorption of the water vapor by the relatively low-water solution, which is supplied to the absorber D via a line 330 from the exchange unit E operating as a generator. The line 330 includes a pump 332 and leads through a heat exchanger 334. The solution relatively high in water is introduced from the absorber D via a line 336, which includes a pump 338 and leads through the heat exchanger 334, into the generator E. The vapor produced in the heat exchanger element 328 is separated in a separation vessel 340 and delivered to the vapor collecting line 310. The remaining brine is introduced from the separating vessel 340 via a line 342, which includes a pump 344, into a heat exchanger unit 346, which is disposed in the exchange unit F operating as an absorber and is heated by the heat of condensation of the water vapor produced in the second generator E. The resultant steam is separated in a separating vessel 348 and delivered to the collecting line 310. The brine is introduced via a line 350, which includes a pump 352, into the distillation column 320, with which further distillation columns can be connected in series, in order to exploit the difference between the temperature of the steam in the line 310 and the temperature needed in the heat exchanger element 318 and in the other steam-heated heat exchanger elements 352 and 354. From the absorber F, the solution relatively high in water is introduced via a line 356, which includes a pump 358 and leads through a heat exchanger 360, into the exchange unit G acting as a desorber, which is heated by means of the heat exchanger element 354 connected to the steam line 324. The resultant steam condenses in the condenser H, which includes a heat exchanger element 366 by means of which the waste heat at the temperature $T_0$ is removed. The condensed water is carried out of H via a line 368, which includes a pump 370, into the evaporator C. The solution from the desorber G is returned to the generator A via the line 302, which includes a pump 372 and passes through both the heat exchanger 360 and a further heat exchanger 374. The solution from the generator A which is relatively low in water is introduced into the absorber F via a line 376, which includes a pump 378 and passes through the heat exchanger 374. The waste heat produced in 366 can be used for preheating the untreated water delivered via the line 306.

Figure 43B:
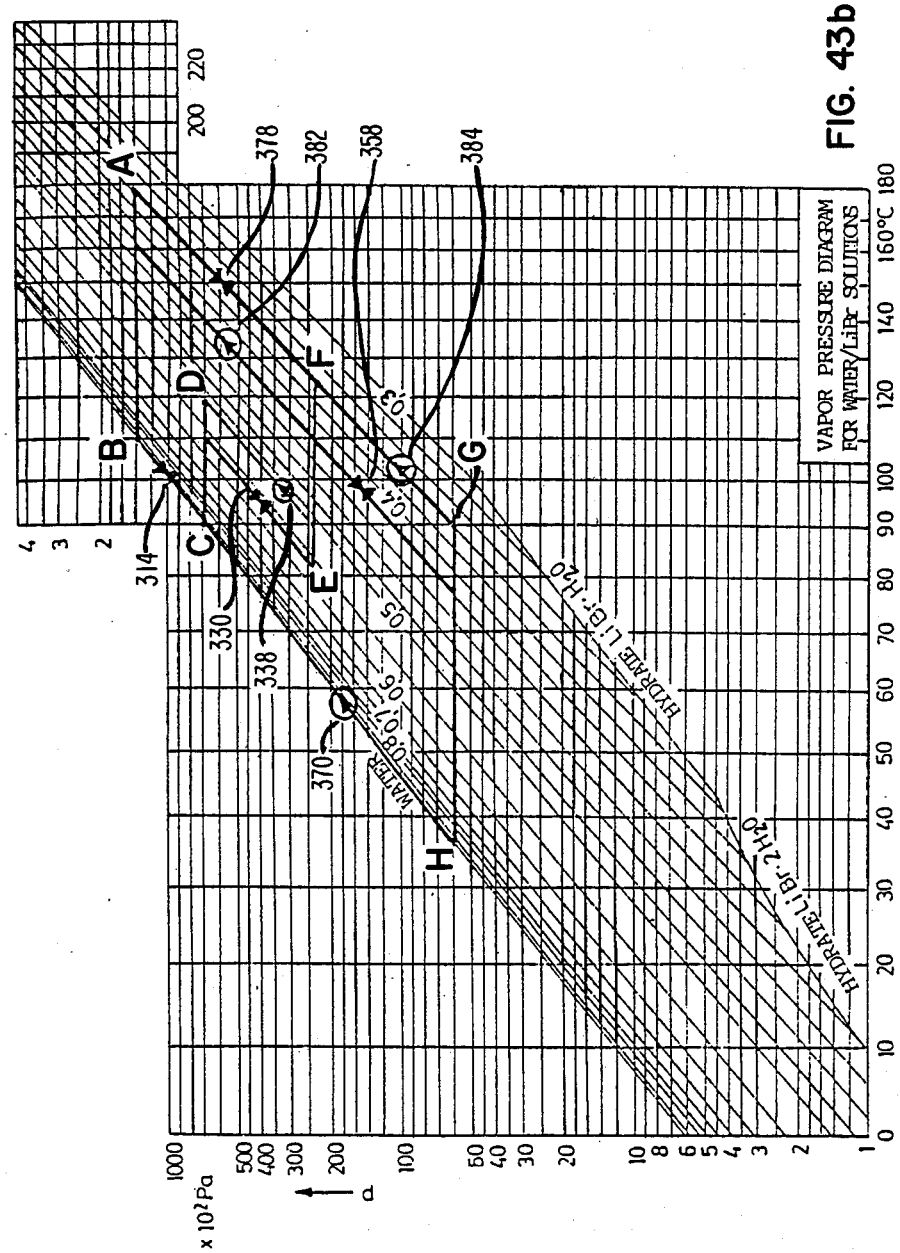
Figure 43C:
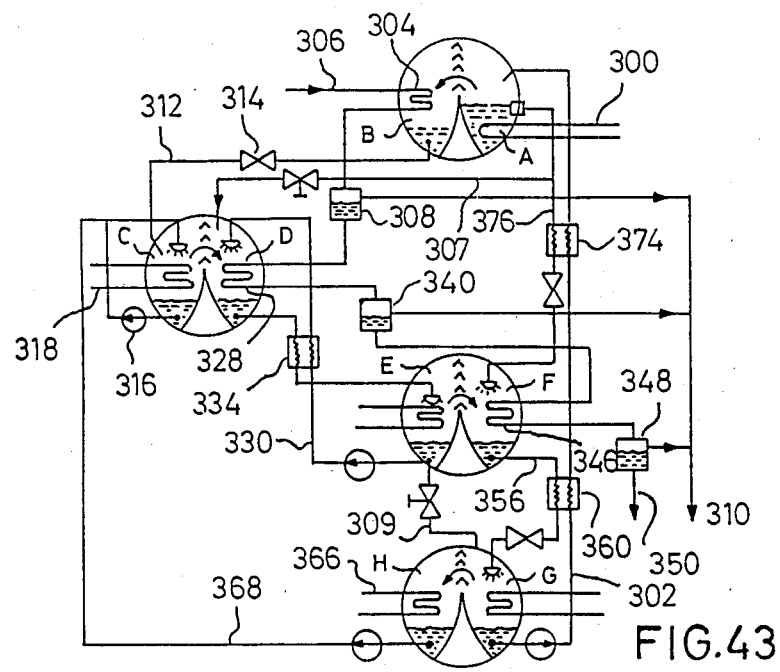

FIG. 43c shows how the absorber arrangement having the exchange units A–H can be realized using horizontally extending exchange unit arrangements. Corresponding elements are identified by the same reference numerals as in FIG. 43a. Additionally, two lines 307 and 209 are shown, which each contain a regulating valve and serve to equalize the solution between the two solution loops.

Figure 43D:
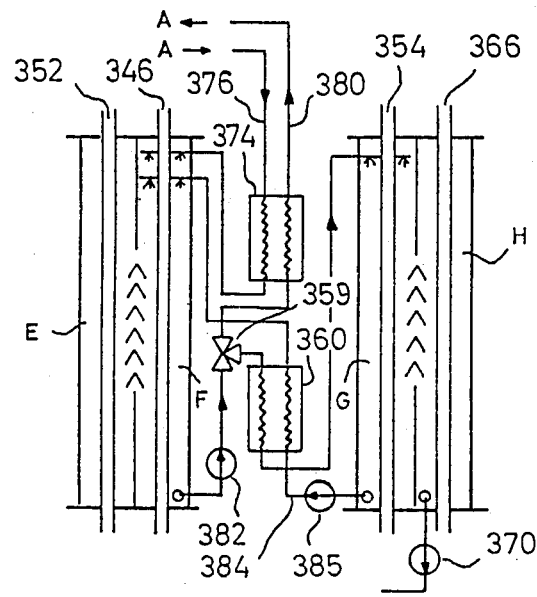

FIG. 43d shows a modification of a portion of the arrangement of FIG. 43a. This modification can also logically be made for FIG. 43c. While in FIG. 43a all the solution from F is carried to G, in FIG. 43d a portion of the solution is carried via a line 380, which includes a pump 382 and leads through the heat exchanger 374, into the exchange unit A. From the exchange unit G, the solution is introduced into the exchange unit F via a line 384, which includes a pump 385 and passes through the heat exchanger 360. From the line 380, between the pump 382 and the heat exchanger 374, another portion of the solution is diverted via a valve 359 and fed through the heat exchanger 360 into the generator G. Otherwise, the arrangement corresponds to that of FIG. 43a. The advantage of this modification is that $T_2-T_1$ at a given $T_0$ and $T_3$ is greater than in FIG. 43a.

The vapor pressure diagram of the absorber arrangement of FIG. 43a, containing the exchange units A–H and modified in the form shown in FIG. 43d, the efficiency of which is approximately 4.1, is provided in FIG. 43b.

FIGS. 46–48 show combinations which include a heat transformer portion according to FIG. 40b and emphasized by means of heavier lines; this portion is combined with a heat pump portion according to FIG. 39a, FIG. 39c and FIG. 39d, respectively.

Figure 40G:
Figure 40K:
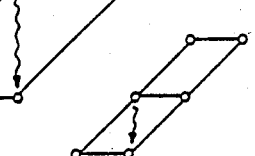
Figure 40R:
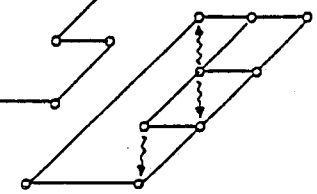
Figures 49, 50, 51:
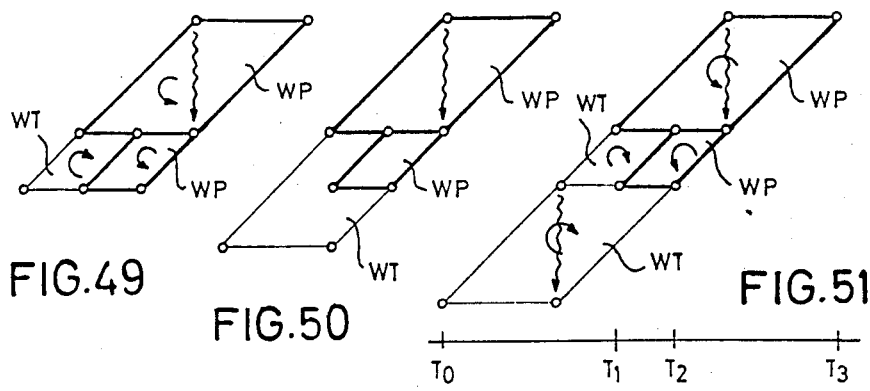

FIGS. 49–51 show combinations of the heat pump configuration of FIG. 39g with a heat transformer configuration of FIG. 40a, FIG. 40b, and FIG. 40g, respectively.

Figures 52, 53, 54:
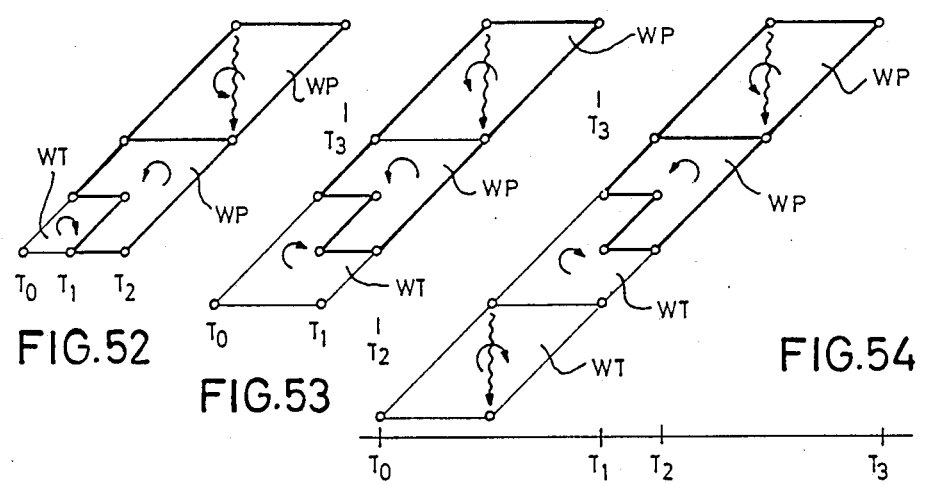

FIGS. 52–54 show combinations of the heat pump configuration of FIG. 39n with a heat transformer configuration of FIG. 40a, FIG. 40b, and FIG. 40n, respectively.

Figures 55, 56, 57:
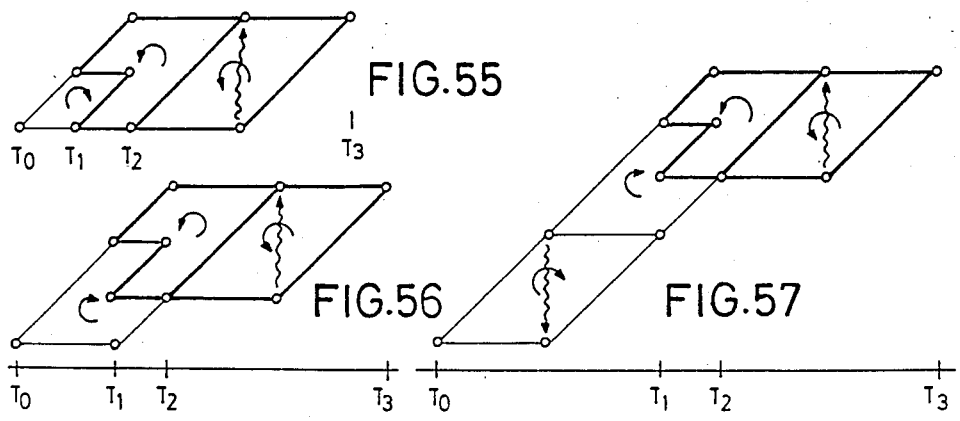

FIGS. 55–57 show combinations of the heat pump configuration of FIG. 39m with a heat transformer configuration of FIG. 40a, FIG. 40b and FIG. 40n, respectively.

Figures 58, 59:
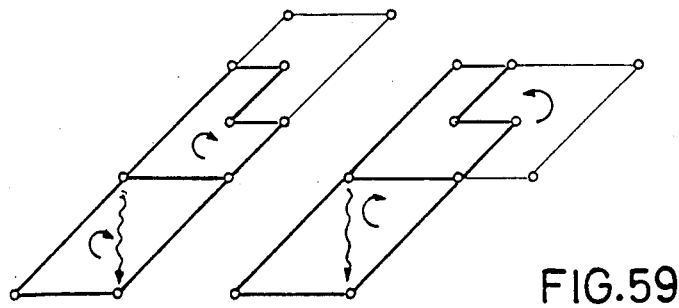

FIGS. 58 and 59 show how the heat transformer configuration of FIG. 40n can be combined with a heat pump configuration of FIG. 39b. The heat transformer configuration could also be combined, analogously with FIG. 48, with a heat pump configuration of FIG. 39a, using only a single additional exchange unit.

Figures 60, 61:
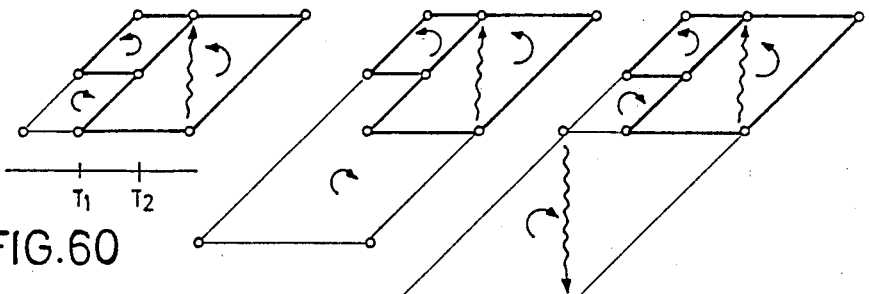
Figure 62:
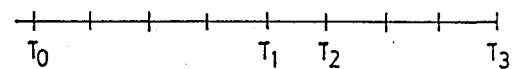

FIGS. 60 and 61 show how a heat pump configuration of FIG. 39e is combined with a heat transformer configuration of FIG. 40a or FIG. 40b, respectively. FIG. 62 shows a combination of the heat pump configuration of FIG. 39e with the heat transformer configuration of FIG. 40g.

Figure 63:
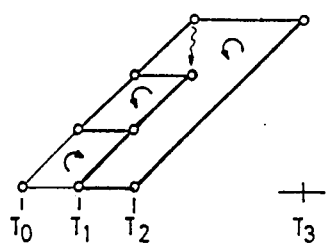
Figure 64:
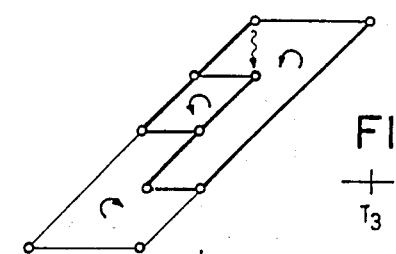
Figure 63A:
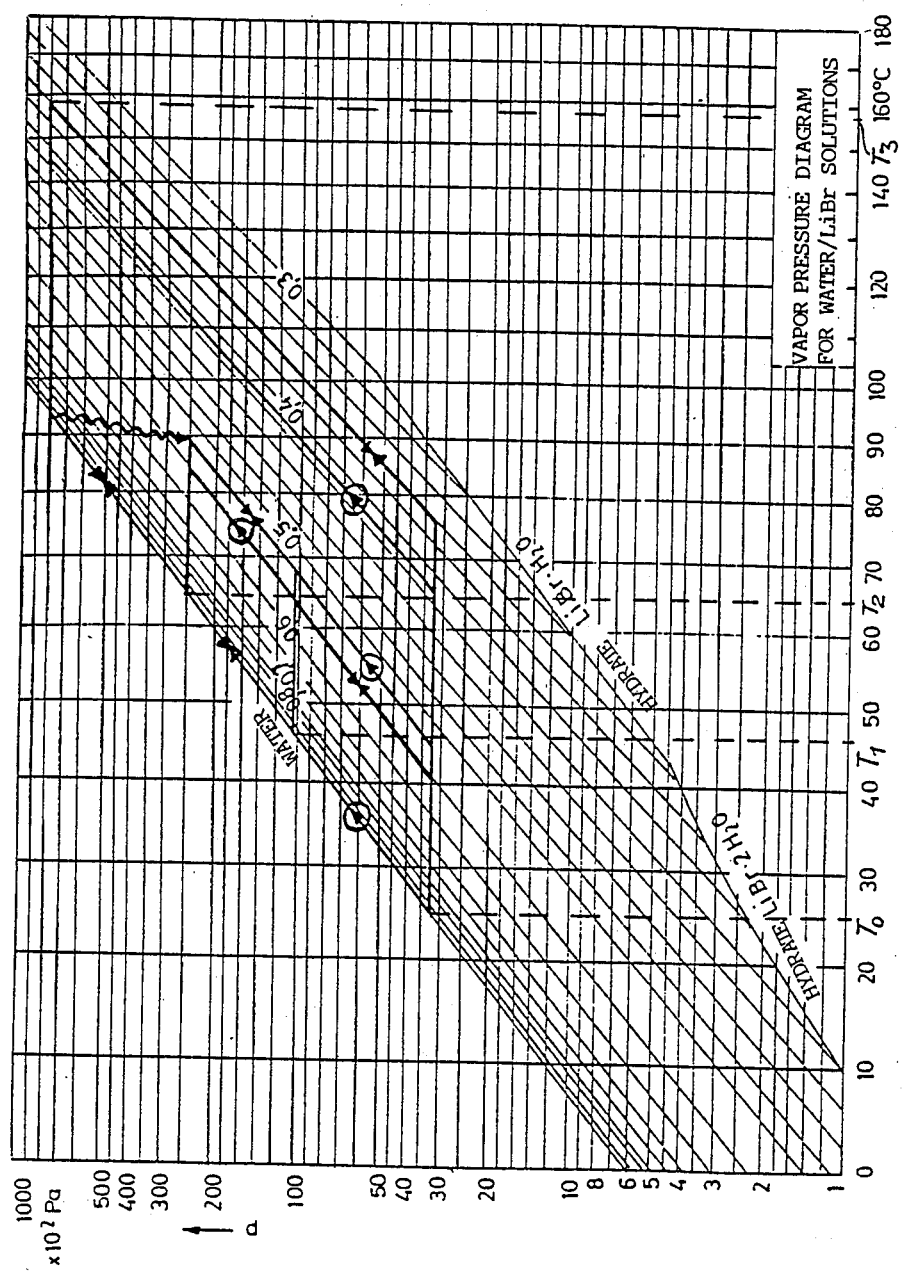

FIGS. 63 and 64 show combinations of the heat pump configuration of FIG. 39i with the heat transformer configuration of FIG. 40a or 40b, respectively. The vapor pressure diagram for an absorber arrangement according to FIG. 63, which is designed for gentle concentration of temperature-sensitive substances such as milk and has an efficiency of approximately 4.2, is shown in FIG. 63a.

Figure 65:
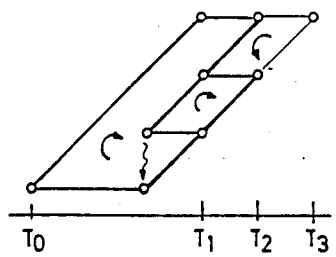
Figure 66:
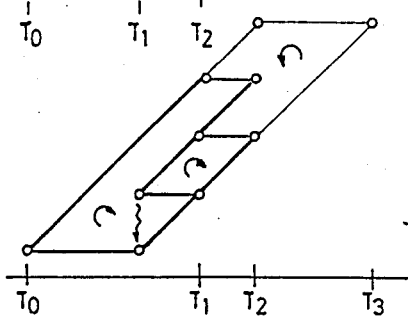

FIGS. 65 and 66 show the combination of a heat transformer configuration of FIG. 40i with a heat pump configuration of FIG. 39a and FIG. 39b, respectively.

Figure 67:
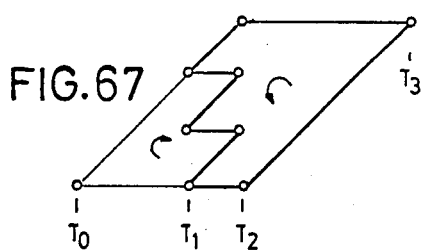
Figure 68:
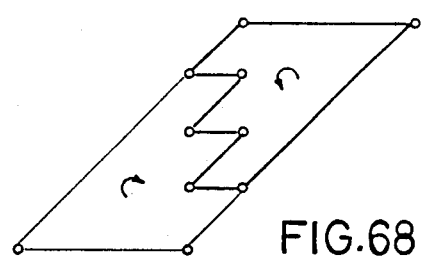

FIGS. 67 and 68 show the combination of a heat pump configuration of FIG. 39h with a heat transformer configuration of FIG. 40b and FIG. 40h, respectively.

Figure 69:
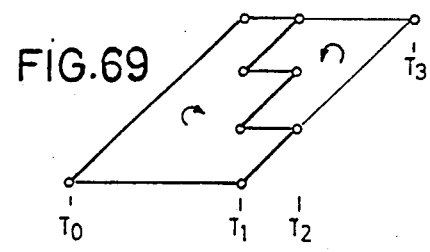
Figure 70:
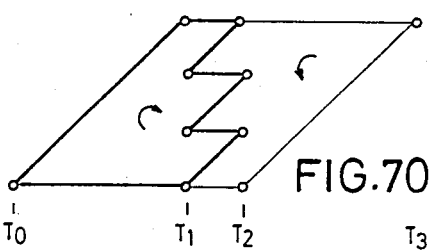
Figure 71:
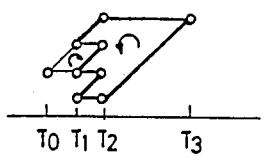
Figure 73:
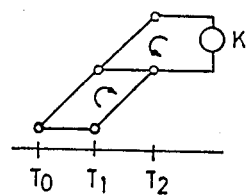

FIGS. 69 and 70 show the combinations of a heat transformer combination of FIG. 40h with a heat pump configuration of FIG. 39b and FIG. 39h, respectively. FIG. 73 shows the combination of a heat pump configuration of FIG. 39h with a heat transformer configuration of FIG. 40a. The exemplary embodiments of FIGS. 67–70 show particularly clearly how great are the savings in terms of equipment that can be attained with the described combinations. The configuration of FIG. 39h is functionally a three-stage heat pump. By means of only a single additional exchange unit, which operates at $T_0$, a combination of a functionally three-stage heat pump with a functionally two-stage heat transformer is attained. In FIG. 68, by means of two additional exchange units, a combination of a functionally three-stage heat pump with a functionally three-stage heat transformer is attained. The situation is analogous for FIGS. 69 and 70.

The heat pump portion of the heat pump/heat transformer combination of a plant according to the invention can also be replaced or supplemented with a compressor/heat pump stage, as shown in FIGS. 72–94.

Figure 3:
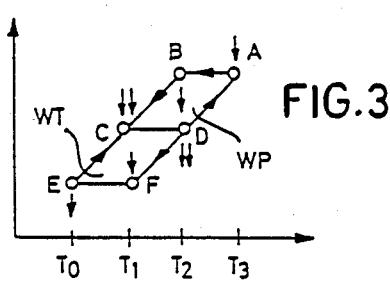
Figure 4:
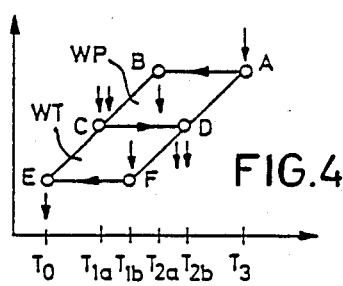
Figure 5:
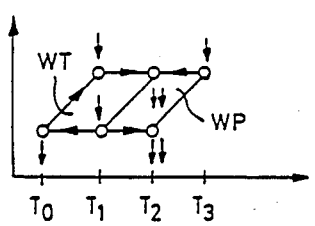
Figure 72:
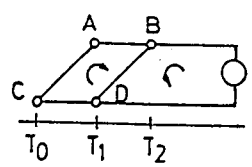

FIGS. 72 and 73 correspond to FIGS. 5 and 3, respectively, with the exception that the absorber/heat pump stage WP of the arrangements of FIGS. 3 and 5 is replaced in each case with a compressor/heat pump stage.

Figure 74:
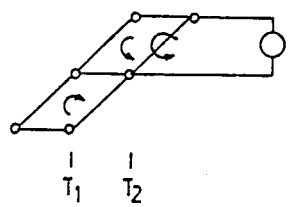
Figure 75:
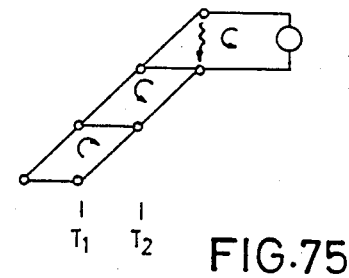
Figure 76:
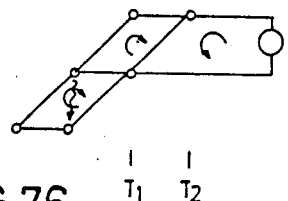
Figure 77:
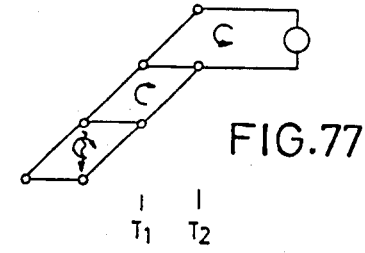
Figure 78:
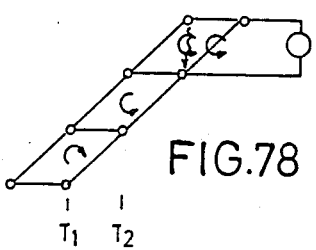
Figure 79:
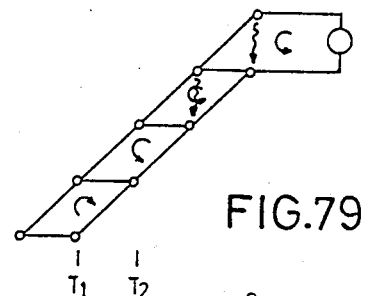
Figure 80:
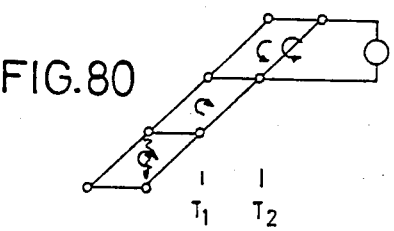
Figure 81:
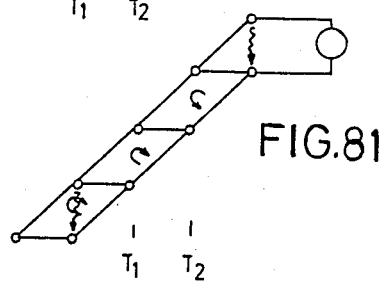
Figure 84:
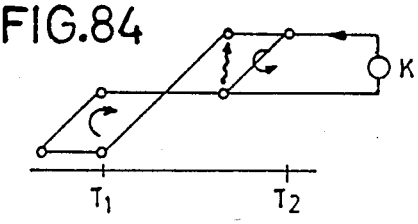

The arrangement of FIG. 74 corresponds approximately to FIG. 15; the arrangement of FIG. 75 corresponds to that of FIG. 14; the arrangement of FIG. 76 corresponds to that of FIG. 16; the arrangement of FIG. 77 corresponds to that of FIG. 14; the arrangement of FIG. 78 corresponds to that of FIG. 24; the arrangement of FIG. 79 corresponds to that of FIG. 22; the arrangement of FIG. 80 corresponds to that of FIG. 20; the arrangement of FIG. 81 corresponds to that of FIG. 19; the arrangement of FIG. 82 includes the configuration according to FIG. 6 and an additional compressor K, which is incorporated between the exchange units having the highest and the next highest pressure range. FIG. 83 also includes the configuration of FIG. 6, and additionally includes a compressor heat pump loop having a compressor K, the intake side of which communicates with the exchange units operating at the highest pressure range in the configuration of FIG. 6 and the outlet of which is connected to an additional exchange unit, operating as a condenser, which is in heat exchange with the exchange unit operating in the highest pressure range and the upper temperature ranges in the configuration of FIG. 6 and communicates via a line, which carries water in the liquid phase and includes a throttle, with the exchange unit of the configuration of FIG. 6 that operates in the lower temperature range of the highest pressure range of this configuration.

FIG. 84 once again includes the configuration of FIG. 6; the compressor K here, however, is incorporated between the exchange units of the configuration of FIG. 6 that operate in the middle and upper pressure range, and in the portion of the arrangement of FIG. 84 corresponding to FIG. 6 an internal heat exchange is provided between the exchange unit operating in the upper temperature range of the middle pressure range and the exchange unit operating in the lower temperature range of the upper pressure range.

The arrangement of FIG. 85 corresponds to that of FIG. 26. The arrangement of FIG. 86 is analogous to that of FIG. 7.

The arrangement of FIG. 87 is similar to that of FIG. 86, with the exception that an additional exchange unit X is provided, so that the throughput of working medium in the heat pump loop WP and in the heat transformer loop WT can be adjusted independently, so that at a temperature $T_z$ located between $T_2$ and $T_1$, heat can be removed from or fed into the exchange unit X.

The arrangement of FIG. 88 is analogous to FIG. 6. The arrangement of FIG. 89, analogously to FIG. 87, includes an additional exchange unit X, so that once again a middle temperature range $T_z$ is available for removing or supplying heat.

The arrangement of FIG. 90 corresponds to that of FIG. 9.

The arrangement of FIG. 91 corresponds to that of FIG. 53.

Figure 1A:
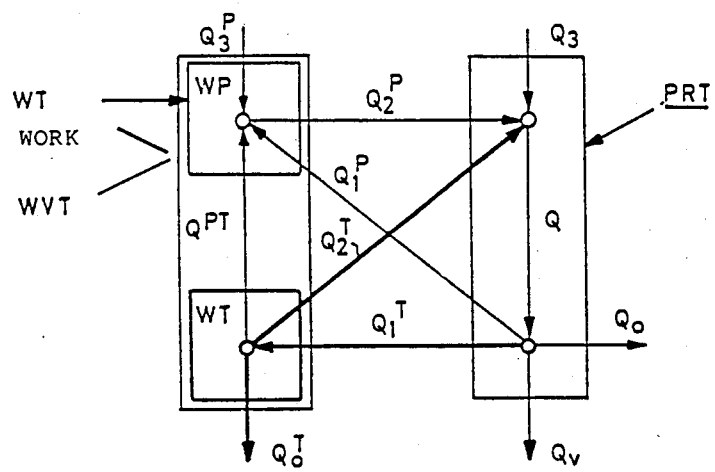
Figure 1B:
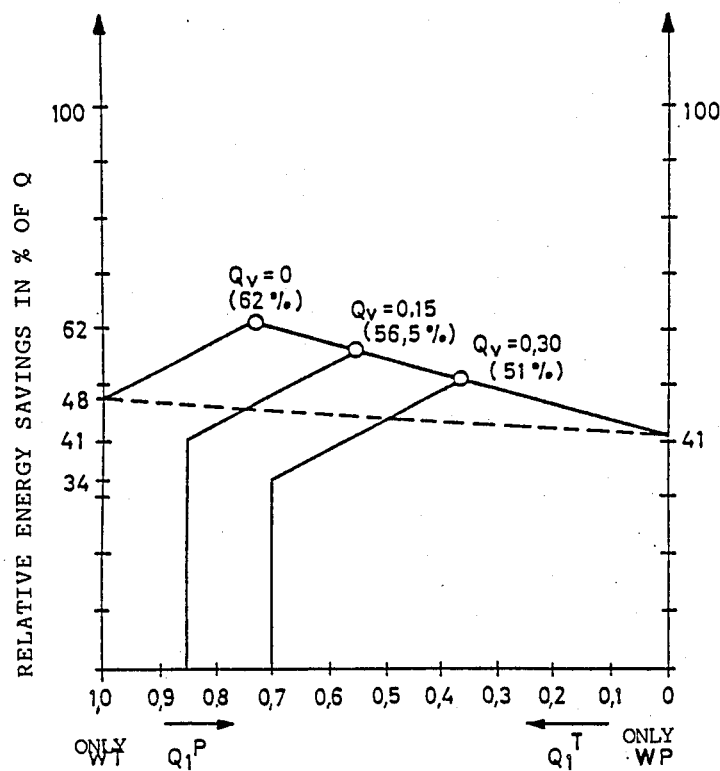
Figure 2:
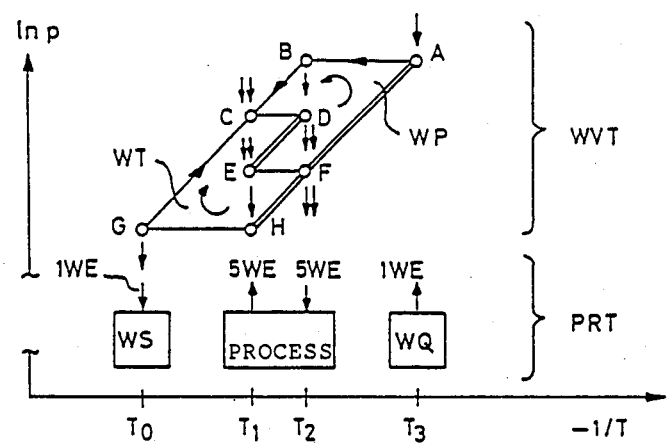

The arrangement of FIG. 92 is a combination of the arrangement of FIG. 2, with an additional compressor/heat pump stage, which includes a compressor incorporated between the exchange units C and A.

FIG. 93 corresponds to FIG. 92, except that here the compressor is incorporated between the exchange units E and D.

FIG. 94 corresponds to FIG. 92, except that here the compressor is incorporated between the exchange units F and A.

FIG. 95 shows somewhat more precisely a two-stage heat pump configuration, of the type shown in FIG. 39c, having an additional, particularly advantageous heat exchanger arrangment. The heat pump configuration according to FIG. 95 includes a first stage, operating at a relatively high pressure range and having the exchange units A, B, E, F, and a stage operating at a relatively low range and having the exchange units C, D, E, F. The exchange units B and E are connected by means of a line 900, which includes a throttle 902 and carries a liquid working medium, such as water. The exchange units A and C, and C and F, respectively, are connected by means of conventional loops 904 and 906 carrying absorbent or solution, each of which includes a heat exchanger 908 and 910, respectively. Furthermore, lines for working fluid in the vapor phase are provided between the exchange units A and B, B and D, and E and F (in principle, the line 900 could also lead from B to D).

The arrangement of the exchange units and lines corresponds to what is shown in a vapor pressure diagram, for instance, similar to FIG. 14b. B and C may be in a relationship of heat exchange with one another, but this is not necessary. According to a feature of the present invention, an arrangement 912 for heat exchange between the liquid working medium in the line 900 of the working fluid loop operating at higher pressures and a partial flow of the absorbent (solution) that is high in working fluid in a line 914 of the working fluid loop or absorbent loop operating at lower pressures is provided. To this end, the line 914 leading from F to C, which includes a pump 916 and, as mentioned, carries absorbent high in working fluid, for instance lithium bromide solution high in water, is provided with a branch line 918, which includes a regulating valve 920, leads through the heat exchanger 912 and bypasses the portion of the line 914 leading through the heat exchanger 910. In the configuration shown, the line 914 leads past the exchange unit C, through the heat exchanger 908, directly to the exchange unit (generator) A. Here again, the line 914 could lead through the exchange unit C, but in that case a further pump would be required between C and A.

FIG. 96 shows a quite analogous modification of a two-stage heat transformer of the type shown in FIG. 40c. Here again, a heat exchange takes place between a liquid working fluid, which flows in a line 930 of a working fluid loop operating at relatively high pressures, in heat exchange with a partial flow of the absorbent that is high in working fluid and flows in the absorbent loop of the working fluid loop operating at relatively low pressures. Since the configurations of FIG. 95 and FIG. 96 operate quite analogously in terms of the heat exchanger 912, further description should be unnecessary.

The heat exchanger arrangements of FIGS. 95 and 96 can be used quite generally in all absorber arrangements that include two heat pump or heat transformer stages of the above-described type. The internal heat exchange, represented by a wavy arrow, is not essential to the function of the above-described special heat exchanger 912.

In closing, it should also be noted that in distillation and desalination plants, which contain distillation towers such as are shown for instance in FIG. 14a and FIG. 43a, the brine can also be carried first through the distillation columns and then through the plant equipped with a heat supply arrangement according to the invention. It is also possible to vary the order of the units of the plant through which the brine flows in succession.

I claim:

1. A plant having a two-stage heat pump portion which includes a two-stage heat pump comprising
a first working fluid circuit operating in a first pressure range and including a circuit portion carrying liquid working fluid, and
a second working fluid circuit operating in a second pressure range which is lower than said first pressure range,
said second working fluid circuit including a portion in which said working fluid is absorbed in and carried by an absorbent, said heat pump portion further comprising means for exchanging heat between liquid working fluid in said first working fluid circuit and a partial flow of working-fluid-rich absorbent in said second working fluid circuit (FIG. 95).

2. The plant of claim 1, having a heat transformer portion which includes
a first working fluid circuit operating in a first pressure range and including a circuit portion carrying liquid working fluid, and
a second working fluid circuit operating in a second pressure range which is lower than said first pressure range,
said second working fluid circuit including a portion in which said working fluid is absorbed in and carried by an absorbent, said heat pump portion further comprising means for exchanging heat between liquid working fluid in said first working fluid circuit and a partial flow of working-fluid-rich absorbent in said second working fluid circuit (FIG. 96).

3. A plant comprising
a processing portion for performing an industrial process which requires input heat in at least one input heat temperature range ($T_2$) and produces output heat to be removed in at least one output heat temperature range ($T_1$) which is lower than said input heat temperature range, said process portion having input heat receiving port means and output heat delivering port means, and
a heat supply portion including a combination of a heat pump part (WP) and a heat transformer part (WT), said combination having
(a) first entrance means for receiving input energy from an external energy source, said first entrance means being coupled to said heat pump part to supply driving energy to said part
(b) second entrance means coupled to said output port means to receive output heat from said process portion and supplying the process portion output heat received both to said heat pump part and to said heat transformer part,
(c) first heat exit means coupled to said input port means for providing input heat to said process portion,
(d) second heat exit means coupled between said heat transformer part and a heat sink receiving from said transformer part heat in a temperature range ($T_0$) which is lower than said process portion output heat temperature range ($T_1$)
wherein an increased efficiency is obtained by a plurality of passes of process portion output heat through a heat loop comprising said process portion and said combination.

4. The plant as claimed in claim 3, wherein said heat transformer part and said heat pump part include only a single working fluid circuit loop (FIGS. 6, 7, 26, 27).

5. The plant as claimed in claim 3 wherein said heat pump part and said heat transformer part each include a plurality of exchange units, at least one of said exchange units being common to both of said parts.

6. The plant as claimed in claim 3 wherein said heat pump part forms a multi-stage heat pump having only a single working fluid circuit loop (FIG. 39o, FIG. 39q).

7. The plant as claimed in claim 3, wherein said heat transformer part forms a multi-state heat transformer having only a single working fluid circuit loop (40o, 40q).

8. The plant as claimed in claim 3, further including means for preheating material to be processed in said process portion, said preheating means being coupled to receive output heat form said second heat exit means for preheating said material.

9. The plant as claimed in claim 3, wherein said heat pump part includes a two-stage heat pump comprising a first working fluid circuit operating in a first pressure range and including a circuit portion carrying liquid working fluid, and a second working fluid circuit operating in a second pressure range which is lower than said first pressure range, said second working fluid circuit including a portion in which said working fluid is absorbed in and carried by an absorbent, said heat pump part further comprising means for exchanging heat between liquid working fluid in said first working fluid circuit and a partial flow of working fluid-rich absorbent in said second working fluid circuit (FIG. 95).

10. A plant comprising
a heat transformer portion which includes a first working fluid circuit operating in a first pressure range and including a circuit portion carrying liquid working fluid and
a second working fluid circuit operating in a second pressure range which is lower than said first pressure range,
said second working fluid circuit including a portion in which said working fluid is abosrbed in and carried by an absorbent, and
means for exchanging heat between liquid working fluid in said first working fluid circuit and a partial flow of working-fluid-rich absorbent in said second working fluid circuit.

* * * * *